(12) United States Patent
Ohta et al.

(10) Patent No.: US 12,195,886 B2
(45) Date of Patent: Jan. 14, 2025

(54) PRODUCTION METHOD OF LONG MEMBER MADE OF CARBON NANOTUBES

(71) Applicant: TOKUSEN KOGYO CO., LTD., Ono (JP)

(72) Inventors: Eiji Ohta, Kobe (JP); Hiroyuki Ohue, Miki (JP)

(73) Assignee: TOKUSEN KOGYO CO., LTD., Hyogo (JP)

( * ) Notice: Subject to any disclaimer, the term of this patent is extended or adjusted under 35 U.S.C. 154(b) by 286 days.

(21) Appl. No.: 17/778,548

(22) PCT Filed: Oct. 22, 2020

(86) PCT No.: PCT/JP2020/039776
§ 371 (c)(1),
(2) Date: May 20, 2022

(87) PCT Pub. No.: WO2021/131281
PCT Pub. Date: Jul. 1, 2021

(65) Prior Publication Data
US 2023/0009040 A1    Jan. 12, 2023

(30) Foreign Application Priority Data
Dec. 27, 2019  (JP) .................................. 2019-238935

(51) Int. Cl.
*D02G 3/02*         (2006.01)
(52) U.S. Cl.
CPC ......... *D02G 3/02* (2013.01); *D10B 2101/122* (2013.01)
(58) Field of Classification Search
CPC ................... D01H 15/00; D01G 9/005; B65H 19/18–1894; B65H 21/00
See application file for complete search history.

(56) References Cited

U.S. PATENT DOCUMENTS

2009/0053515 A1* 2/2009 Luo ........................... C08K 7/24
                                                        524/424
2011/0133031 A1* 6/2011 Shah ........................ B64G 1/54
                                                        244/119
(Continued)

FOREIGN PATENT DOCUMENTS

DE    10 2008 022 697 A1    12/2009
JP    2011-153392 A           8/2011
(Continued)

OTHER PUBLICATIONS

International Search Report for PCT/JP2020/039776 dated, Dec. 8, 2020 (PCT/ISA/210).

*Primary Examiner* — Shaun R Hurley
(74) *Attorney, Agent, or Firm* — Sughrue Mion, PLLC

(57) ABSTRACT

A production method of a long member including a large number of carbon nanotubes includes the steps of: (1) drawing the carbon nanotubes gradually from a first array to obtain a first web 10a; (2) bringing the first web 10a partially into contact with a first holder 12a to hold the first web 10a on the first holder 12a; (3) drawing the carbon nanotubes gradually from a second array to obtain a second web 10b; (4) bringing the second web 10b partially into contact with a second holder 12b to hold the second web 10b on the second holder 12b; and (5) placing a portion of the first web 10a and a portion of the second web 10b on each other to form a joint, the portions of the first and second webs 10a and 10b being in the vicinity of the first and second holders 12a and 12b, respectively, and being placed on each other such that width directions of the first and second webs 10a and 10b are substantially the same.

14 Claims, 26 Drawing Sheets

(56) References Cited

U.S. PATENT DOCUMENTS

2014/0057769 A1* 2/2014 Steinemann ....... B65H 23/1882
493/381
2017/0136694 A1* 5/2017 Rezai .................... B33Y 30/00
2019/0135576 A1* 5/2019 Syuto .................... B65H 69/08

FOREIGN PATENT DOCUMENTS

JP          2013-47402 A      3/2013
KR       20180104642 A   *  9/2018

* cited by examiner

PRODUCTION METHOD OF LONG MEMBER MADE OF CARBON NANOTUBES

CROSS REFERENCE TO RELATED APPLICATIONS

This application is a National Stage of International Application No. PCT/JP2020/039776 filed Oct. 22, 2020, claiming priority based on Japanese Patent Application No. 2019-238935 filed Dec. 27, 2019.

TECHNICAL FIELD

The present invention relates to a production method of a long member made of carbon nanotubes.

BACKGROUND ART

Carbon nanotubes are excellent in electrical conductivity, thermal conductivity, and specific strength. The use of carbon nanotubes has been studied in diverse fields. Each carbon nanotube is microscopic. Thus, an assembly of a large number of carbon nanotubes can be used as a structural element. Known examples of the assembly are webs and yarns.

Carbon nanotubes can be produced by chemical vapor deposition. This process gives an array of carbon nanotubes. In this array, a large number of carbon nanotubes are oriented in a given direction. The carbon nanotubes are gradually drawn from the array. The drawn carbon nanotubes form a web. The web is in the form of a sheet.

The web is joined to another web to form a joint, thus obtaining a long web. A long yarn can be obtained from the long web. Japanese Laid-Open Patent Application Publication No. 2011-153392 discloses a method of producing a yarn having a joint.

CITATION LIST

Patent Literature

PTL 1: Japanese Laid-Open Patent Application Publication No. 2011-153392

SUMMARY OF INVENTION

Technical Problem

Carbon nanotubes are characterized by high adhesion to other objects. Thus, carbon nanotubes are poor in handleability. The method disclosed in Japanese Laid-Open Patent Application Publication No. 2011-153392 has difficulty in joint formation. Further, in a long web obtained by this method, the arrangement of the carbon nanotubes is disturbed at the joint. Thus, the properties exhibited by the carbon nanotubes significantly differ between the joint and the rest of the long web. This method cannot yield a high-quality long member.

An object of the present invention is to provide a production method capable of yielding a long member made of carbon nanotubes and having high quality.

Solution to Problem

The present invention relates to a production method of a long member including a large number of carbon nanotubes. The production method includes the steps of:

(1) drawing the carbon nanotubes gradually from a first array to obtain a first web;
(2) bringing the first web partially into contact with a first holder to hold the first web on the first holder;
(3) drawing the carbon nanotubes gradually from a second array to obtain a second web;
(4) bringing the second web partially into contact with a second holder to hold the second web on the second holder; and
(5) placing a portion of the first web and a portion of the second web on each other to form a joint, the portions of the first and second webs being in the vicinity of the first and second holders, respectively, and being placed on each other such that width directions of the first and second webs are substantially the same.

Preferably, the production method further includes the step of applying a tension to the joint after the step (5).

Preferably, the production method further includes the step of pressing the joint after the step (5).

Preferably, the production method further includes the step of cutting a portion of the first web away from the joint after the step (5), the portion of the first web remaining on the first holder.

Preferably, the production method further includes the step of cutting a portion of the second web away from the joint after the step (5), the portion of the second web remaining on the second holder.

Preferably, the production method further includes the step of moving the first or second holder in a direction intersecting a longitudinal direction of the long member to increase a density of the carbon nanotubes at the joint after the step (5).

Preferably, the production method further includes the step of bundling the carbon nanotubes of the first and second webs into a yarn after the step (5).

Preferably, the first holder used in the step (2) has a width equal to or greater than a width of the first web. Preferably, the second holder used in the step (4) has a width equal to or greater than a width of the second web.

Preferably, the first holder used in the step (2) is made of a material selected from: a rubber composition containing natural rubber, acrylonitrile-butadiene rubber, or urethane rubber as a base component; a resin composition containing urethane resin or fluororesin as a base component; and a ceramic or metal material. Preferably, the second holder used in the step (4) is made of a material selected from: a rubber composition containing natural rubber, acrylonitrile-butadiene rubber, or urethane rubber as a base component; a resin composition containing urethane resin or fluororesin as a base component; and a ceramic or metal material.

Preferably, the first holder used in the step (2) extends in a direction inclined with respect to the width direction of the first web. Preferably, the second holder used in the step (4) extends in a direction inclined with respect to the width direction of the second web.

Preferably, the first web used in the step (2) is shaped such that a width of the first web gradually increases downstream in the vicinity of the first holder. Preferably, the second web used in the step (4) is shaped such that a width of the second web gradually increases upstream in the vicinity of the second holder.

Preferably, the joint formed in the step (5) has a length of 2 to 50 mm.

In another aspect, an apparatus according to the present invention is used to produce a long member including a large number of carbon nanotubes. The apparatus includes:

a first holder that holds a first web composed of the carbon nanotubes;

a second holder that holds a second web composed of the carbon nanotubes; and a moving mechanism that moves the second holder relative to the first holder to place the second web on the first web.

Preferably, a width of the first holder is greater than a width of the first web. Preferably, a width of the second holder is greater than a width of the second web.

Advantageous Effects of Invention

In the production method according to the present invention, the first web is joined to the second web. Thus, the production method yields a long member made of carbon nanotubes. In the long member, the carbon nanotubes are arranged uniformly at the joint of the first and second webs. The long member has high quality.

DESCRIPTION OF EMBODIMENTS

The following will describe in detail the present invention based on preferred embodiments with appropriate reference to the drawings.

Figure 1:
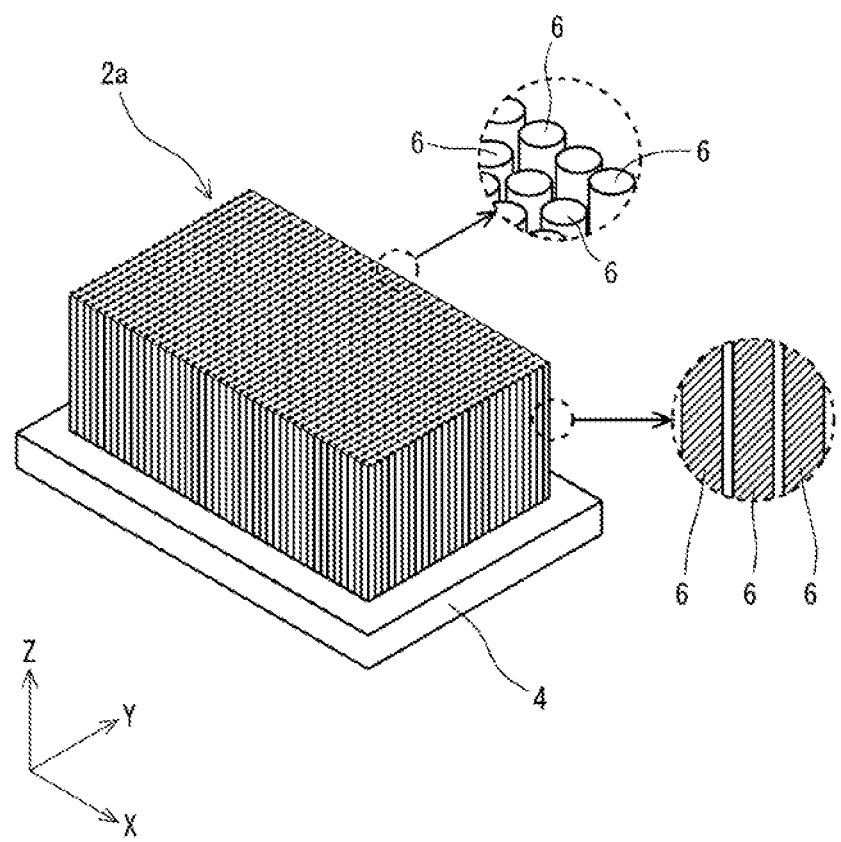
FIG. 1 is a perspective view showing a first array used in a long member production method according to one embodiment of the present invention along with a substrate.

FIG. 1 shows a first array 2a and a substrate 4. The first array 2a has the shape of a block. The first array 2a is an assembly of a large number of carbon nanotubes 6. For convenience of illustration, the carbon nanotubes 6 are hatched in FIG. 1. The carbon nanotubes 6 are oriented in the thickness direction of the first array 2a (Z direction). In other words, each carbon nanotube 6 is substantially upright relative to the substrate 4. Various processes can be used for production of the first array 2a. A typical process is chemical vapor deposition. In this process, each carbon nanotube 6 gradually grows upward from the substrate 4.

The diameter of each carbon nanotube 6 is typically from 0.5 to 100 nm. The length of the carbon nanotube 6 is typically from 0.5 μm to 10 mm. The carbon nanotube 6 may have a single-layer structure, double-layer structure, or multi-layer structure. The first array 2a may be formed from a plurality of types of carbon nanotubes 6 having different structures.

Figure 2:
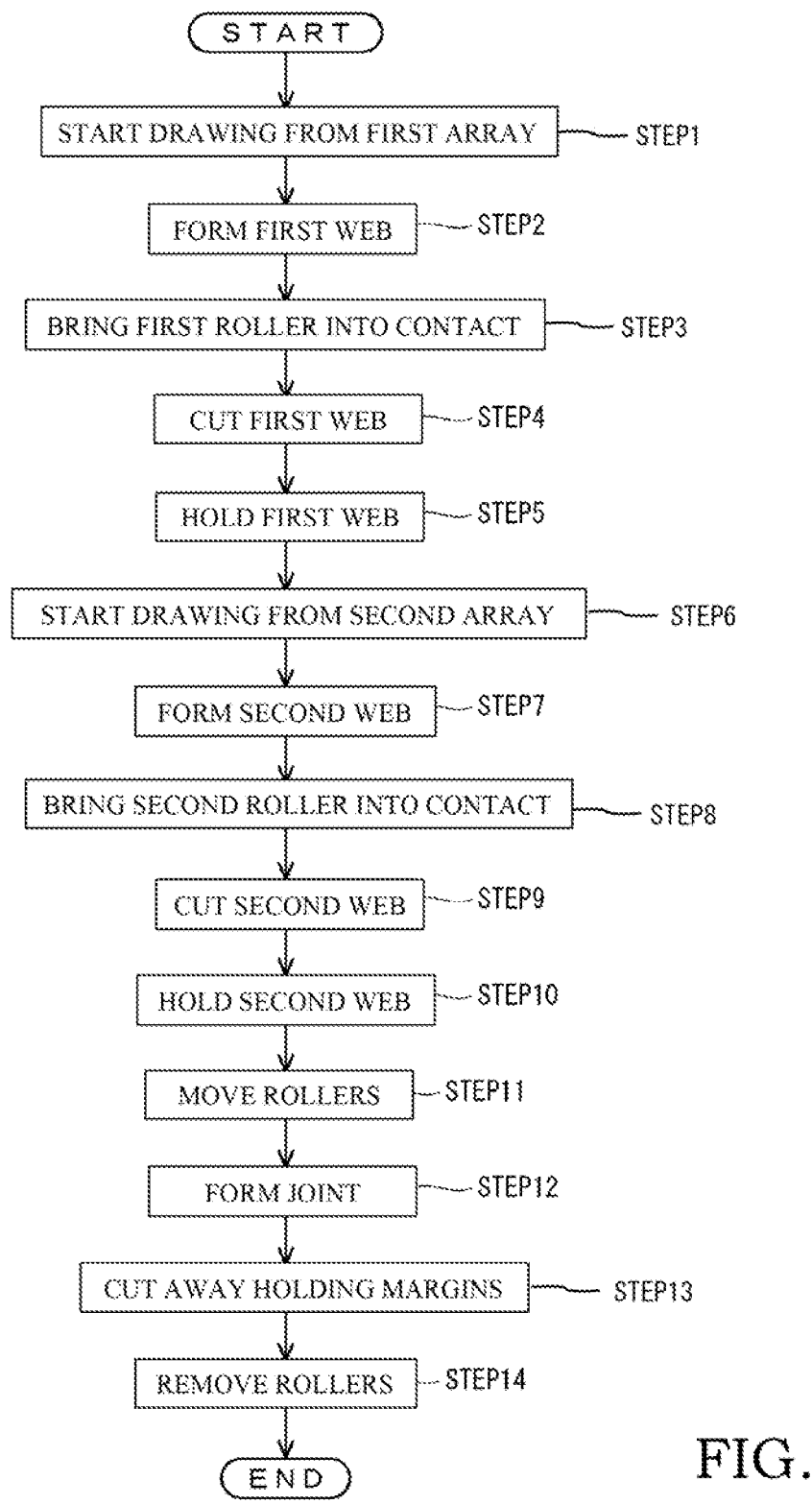
FIG. 2 is a flowchart showing a long member production method using the first array of FIG. 1.

FIG. 2 is a flowchart showing a method of producing a long member using the first array 2a of FIG. 1. In this production method, first, drawing of the carbon nanotubes 6 from the first array 2a is started (STEP 1).

Figure 3A:
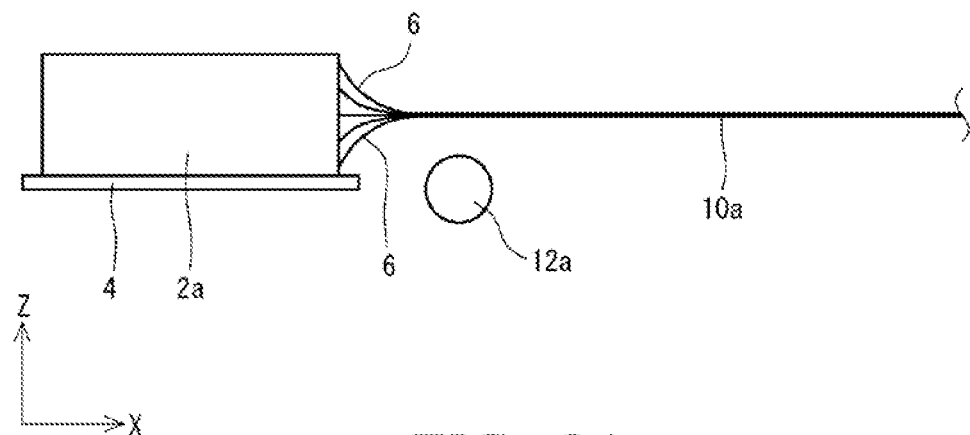
FIG. 3A is a front view showing one step of the production method of FIG. 2.
Figure 3B:
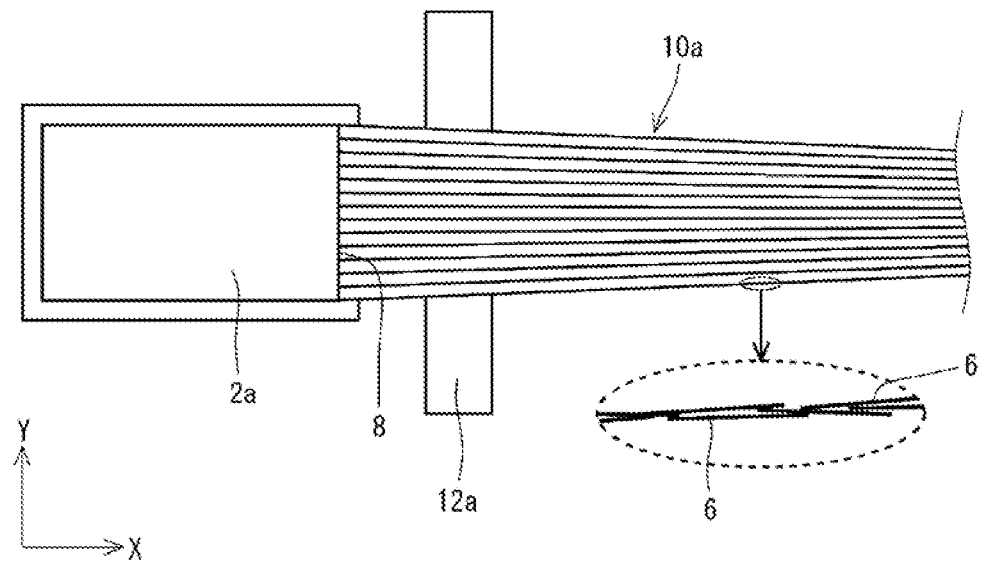
FIG. 3B is a plan view showing the step.

FIG. 3 shows how the drawing is performed. FIG. 3A is a front view, and FIG. 3B is a plan view. As shown in FIG. 3, the drawing is performed on a side surface 8 of the first array 2a. One or a few carbon nanotubes 6 are held by a chuck and drawn. Following the drawn carbon nanotube(s) 6, other carbon nanotubes 6 are drawn sequentially from the first array 2a. The carbon nanotubes 6 are bound to one another by van der Waals forces. The carbon nanotubes 6 move downstream (rightward in FIG. 3).

The drawing is continued, so that a first web 10a is formed (STEP 2). As shown in FIG. 3A, the thickness (size in the Z direction) of the first web 10a is small. As shown in FIG. 3B, the width (size in the Y direction) of the first web 10a is large. In other words, the first web 10a is in the form of a sheet. In the present embodiment, the width of the first web 10a gradually decreases downstream. In other words, the width of the first web 10a is equal to or smaller than the width of the first array 2a. The width of the first web 10a may be constant. The width of the first web 10a may gradually increase downstream.

FIG. 3 shows a first roller 12a serving as a holder. As is clear from FIG. 3A, the first roller 12a is located below and spaced from the first web 10a. As is clear from FIG. 3B, the width (size in the Y direction) of the first roller 12a is sufficiently greater than the width of the first web 10a.

Figure 4A:
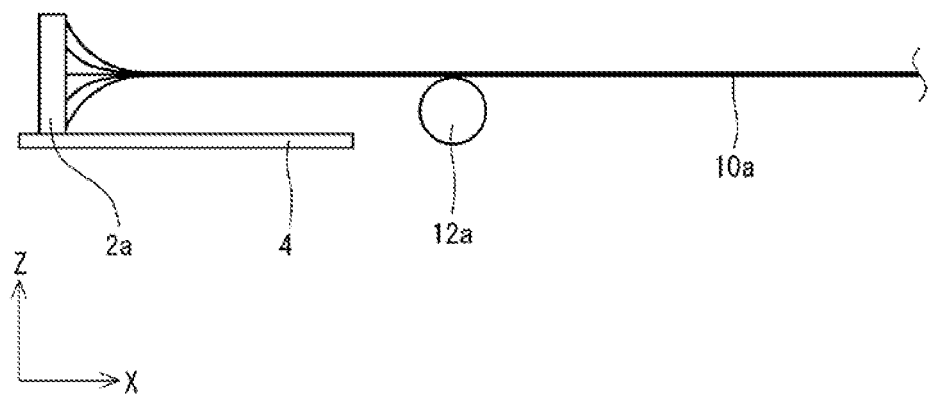
FIG. 4A is a front view showing another step of the production method of FIG. 2.
Figure 4B:
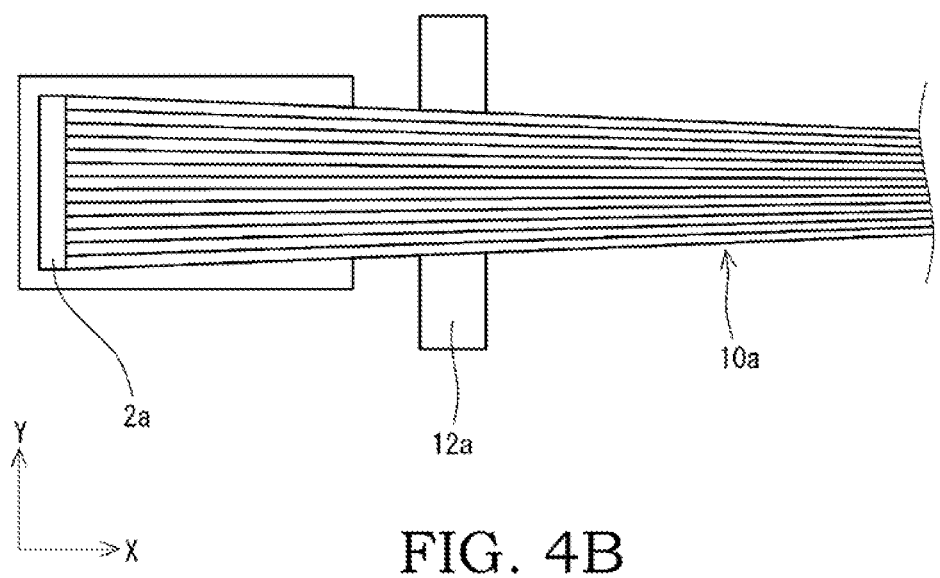
FIG. 4B is a plan view showing the other step.

The drawing is continued, so that the first web 10a grows. As a result of the continued drawing, the carbon nanotubes 6 are consumed, and the size of the first array 2a is reduced. FIG. 4 shows the reduced-size first array 2a.

Figure 5:
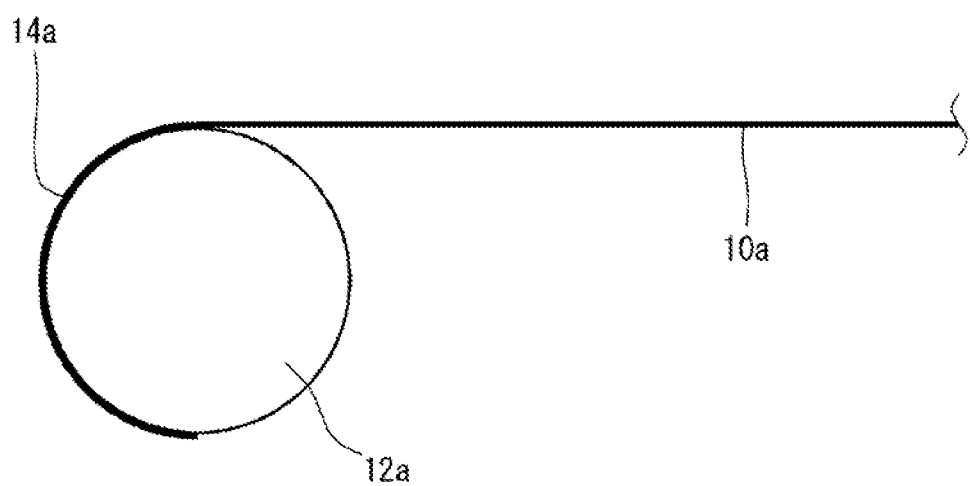
FIG. 5 is an enlarged front view showing yet another step of the production method of FIG. 2.
Figure 5:
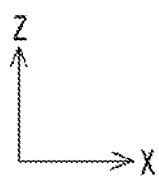
Figure 6:
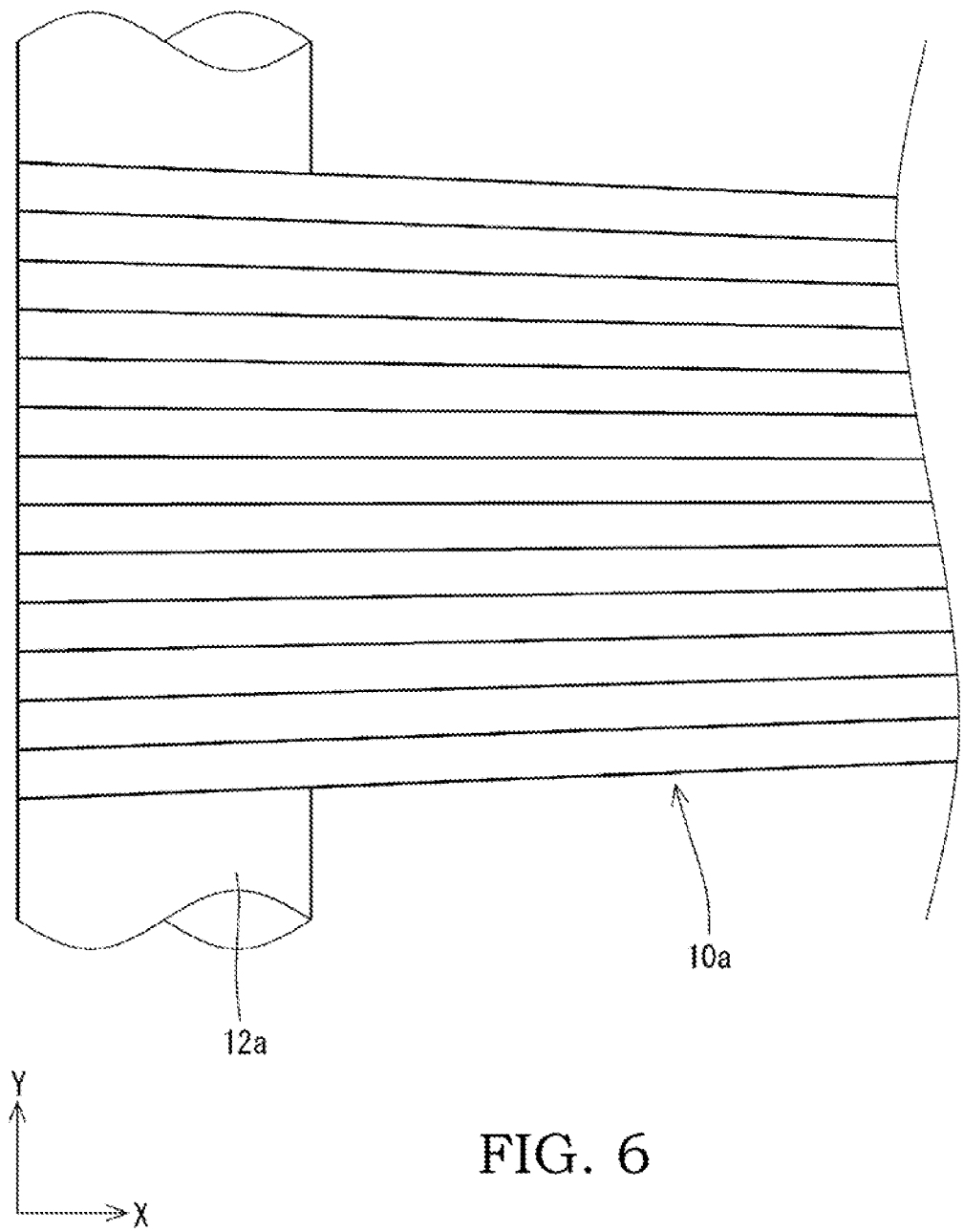
FIG. 6 is a plan view showing the step of FIG. 5.

After the drawing is sufficiently completed, the first roller 12a is brought into contact with the first web 10a (STEP 3). In this embodiment, the first roller 12a is brought into contact with the lower surface of the first web 10a as shown in FIG. 4. Further, the first web 10a is cut at a point upstream of the first roller 12a (STEP 4). The cutting leads to the first web 10a being partially wound on the first roller 12a as shown in FIG. 5. The wound portion is a holding margin 14a of the first web 10a. The first web 10a is held on the first roller 12a by the sticking force of the holding margin 14a (STEP 5). Since the first roller 12a has a width greater than the width of the first web 10a, the first web 10a can be held on the first roller 12a without disturbance of the arrangement of the carbon nanotubes 6. As shown in FIG. 6, the first web 10a held in this state is separate from the first array 2a (see FIG. 4). The cutting (STEP 4) may be performed after the holding by winding (STEP 5). If the sticking of the first web 10a is insufficient, the holding may be done with the aid of auxiliary means such as an adhesive or a double-sided tape.

Figure 7A:
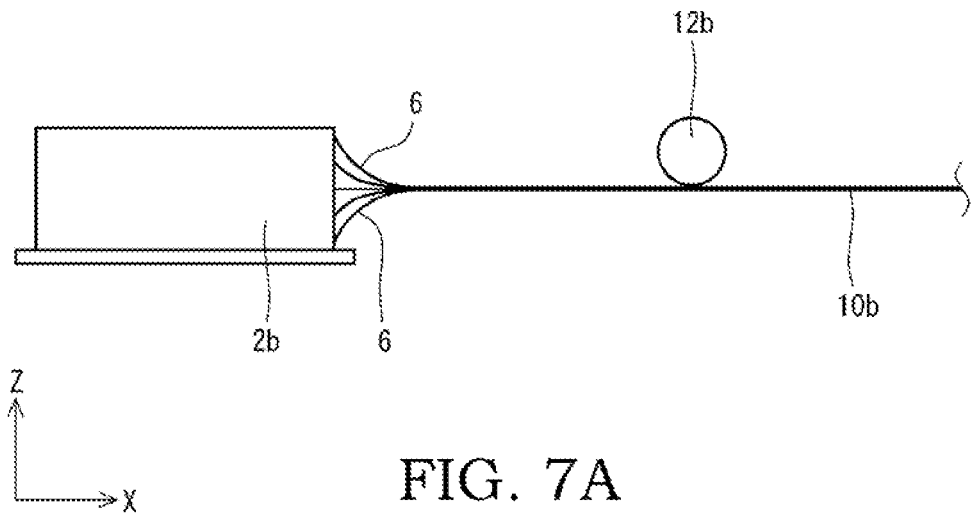
FIG. 7A is a front view showing yet another step of the production method of FIG. 2.

Meanwhile, a second array 2b shown in FIG. 7 is prepared. The structure of the second array 2b is the same as the structure of the first array 2a. The second array 2b includes a large number of carbon nanotubes 6. Drawing of the carbon nanotubes 6 from the second array 2b is started (STEP 6). Following the drawn carbon nanotubes 6, other carbon nanotubes 6 are drawn sequentially from the second array 2b. The carbon nanotubes 6 are bound to one another by van der Waals forces. The carbon nanotubes 6 move downstream. The drawing results in formation of a second web 10b (STEP 7). The second web 10b is in the form of a sheet like the first web 10a. In the present embodiment, the width of the second web 10b gradually decreases downstream. In other words, the width of the second web 10b is equal to or smaller than the width of the second array 2b. The width of the second web 10b may be constant. The width of the second web 10b may gradually increase downstream.

Figure 7B:
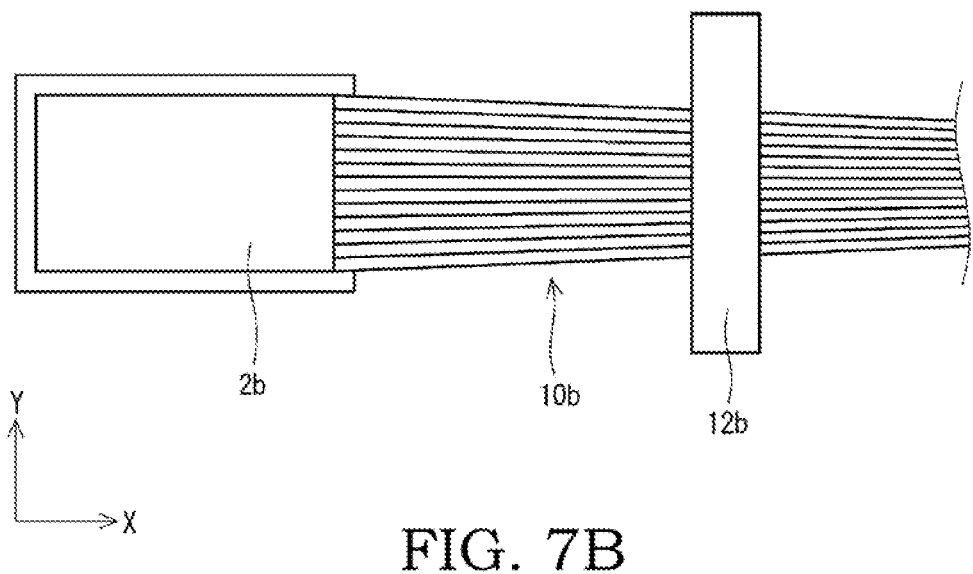
FIG. 7B is a plan view showing the yet other step.

FIG. 7 shows a second roller 12b. As is clear from FIG. 7B, the width (size in the Y direction) of the second roller 12b is sufficiently greater than the width of the second web 10b.

Figure 8:
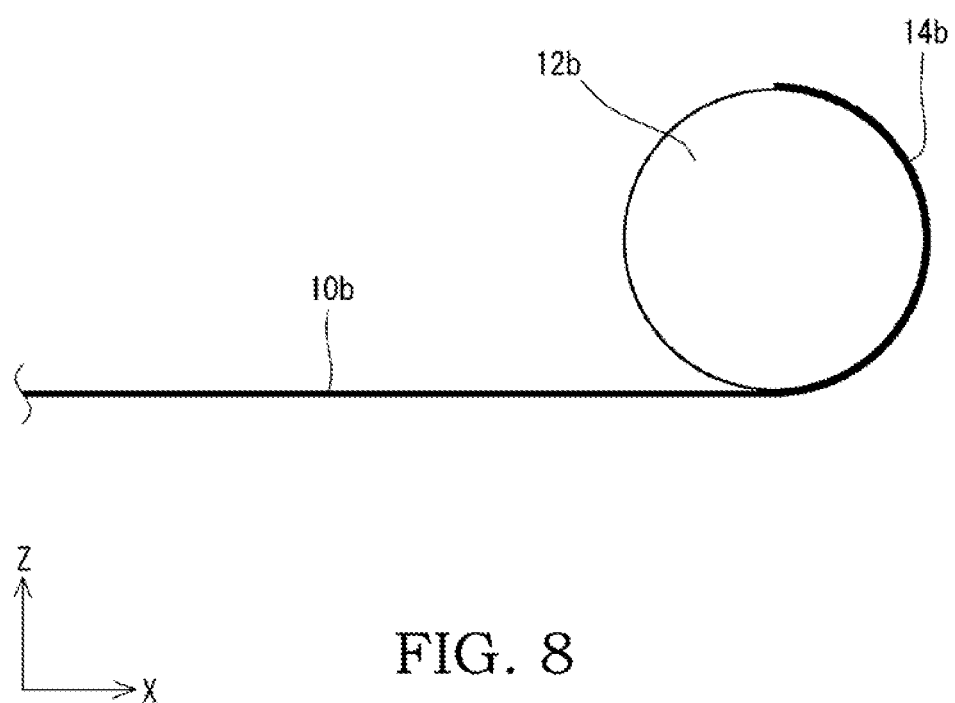
FIG. 8 is an enlarged front view showing yet another step of the production method of FIG. 2.
Figure 9:
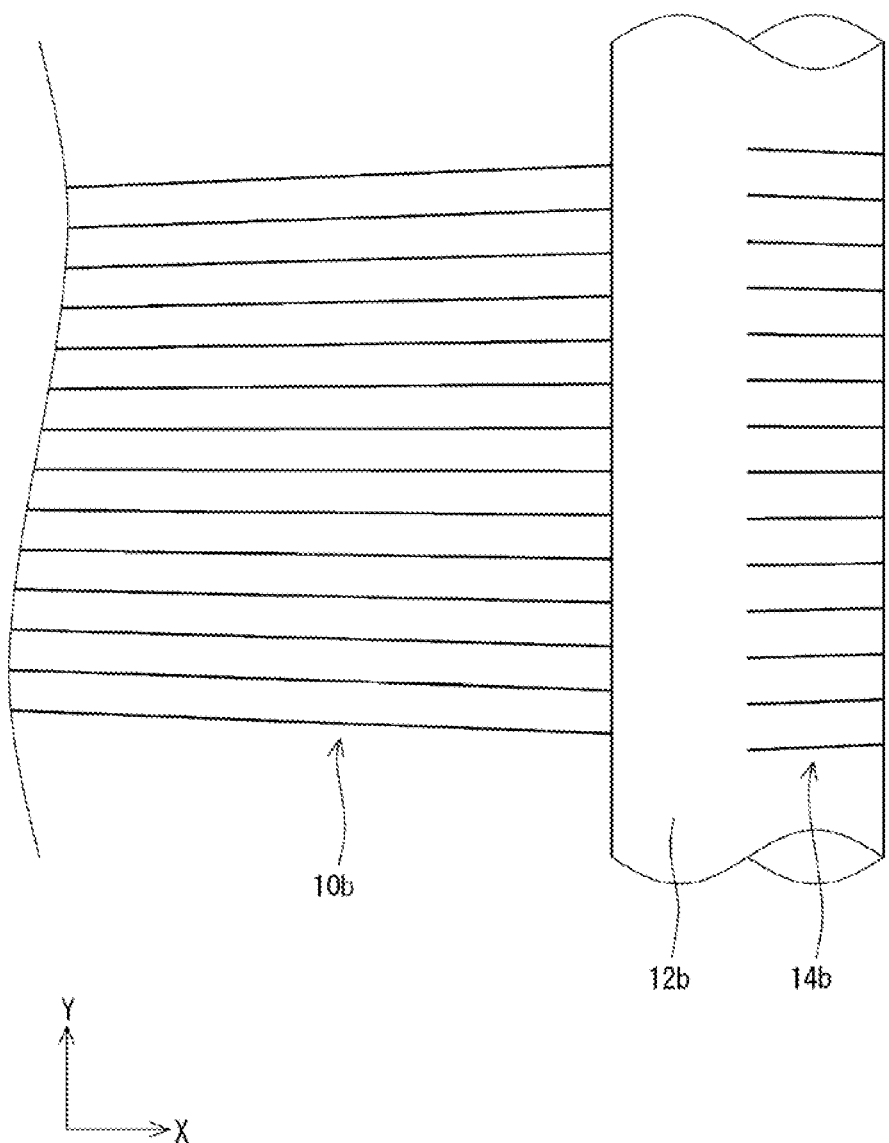
FIG. 9 is a plan view showing the step of FIG. 8.

At a relatively early stage of the drawing (a stage where the size of the remaining second array 2b is still large), the second roller 12b is brought into contact with the second web 10b (STEP 8). In this embodiment, the second roller 12b is brought into contact with the upper surface of the second web 10b as shown in FIG. 7. Further, the second web 10b is cut at a point downstream of the second roller 12b (STEP 9). The cutting leads to the second web 10b being partially wound on the second roller 12b as shown in FIGS. 8 and 9. The wound portion is a holding margin 14b of the second web 10b. The second web 10b is held on the second roller 12b by the sticking force of the holding margin 14b (STEP 10). The second web 10b held in this state is continuous with the second array 2b. Since the second roller 12b has a width greater than the width of the second web 10b, the second web 10b can be held on the second roller 12b without disturbance of the arrangement of the carbon nanotubes 6. The cutting (STEP 9) may be performed after the holding by winding (STEP 10). If the sticking of the second web 10b is insufficient, the holding may be done with the aid of auxiliary means such as an adhesive or a double-sided tape.

The steps from the start of the drawing of the carbon nanotubes 6 from the second array 2b (STEP 6) to the holding of the second web 10b on the second roller 12b (STEP 10) may be performed prior to the steps from the start of the drawing of the carbon nanotubes 6 from the first array 2a (STEP 1) to the holding of the first web 10a on the first roller 12a (STEP 5). The steps from the start of the drawing of the carbon nanotubes 6 from the second array 2b (STEP 6) to the holding of the second web 10b on the second roller 12b (STEP 10) may be performed concurrently with the steps from the start of the drawing of the carbon nanotubes 6 from the first array 2a (STEP 1) to the holding of the first web 10a on the first roller 12a (STEP 5).

Figure 10:
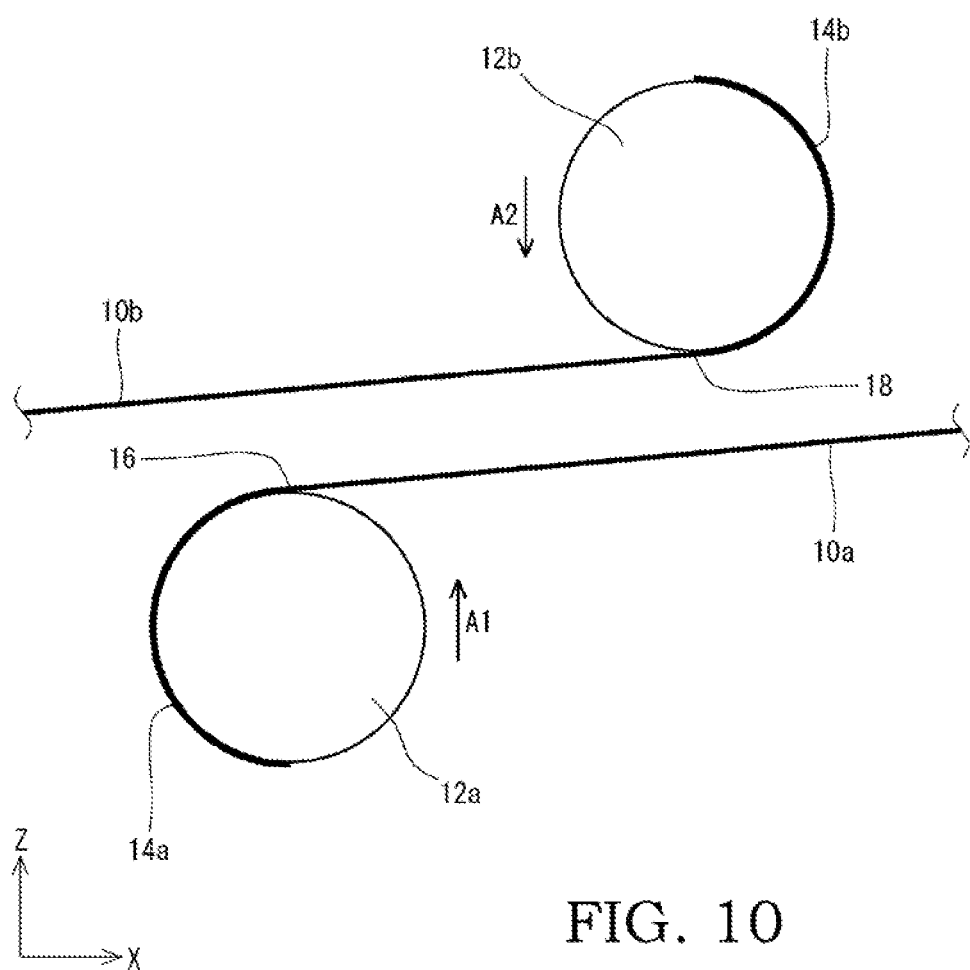
FIG. 10 is an enlarged front view showing yet another step of the production method of FIG. 2.

FIG. 10 shows the first and second rollers 12a and 12b viewed after completion of the holding of the second web 10b (STEP 10). In FIG. 10, the first roller 12a is located upstream (to the left) of the second roller 12b. The first roller 12a is located below the second roller 12b. Thus, the first web 10a is located below the second web 10b. The first web 10a, except for the holding margin 14a, extends downstream (rightward) from the vicinity of the top 16 of the first roller 12a. The second web 10b, except for the holding margin 14b, extends upstream from the vicinity of the bottom 18 of the second roller 12b.

The first roller 12a may be located above the second roller 12b. In this case, the first web 10a, except for the holding margin 14a, extends downstream from the vicinity of the bottom of the first roller 12a. The second web 10b, except for the holding margin 14b, extends upstream from the vicinity of the top of the second roller 12b.

Figure 11:
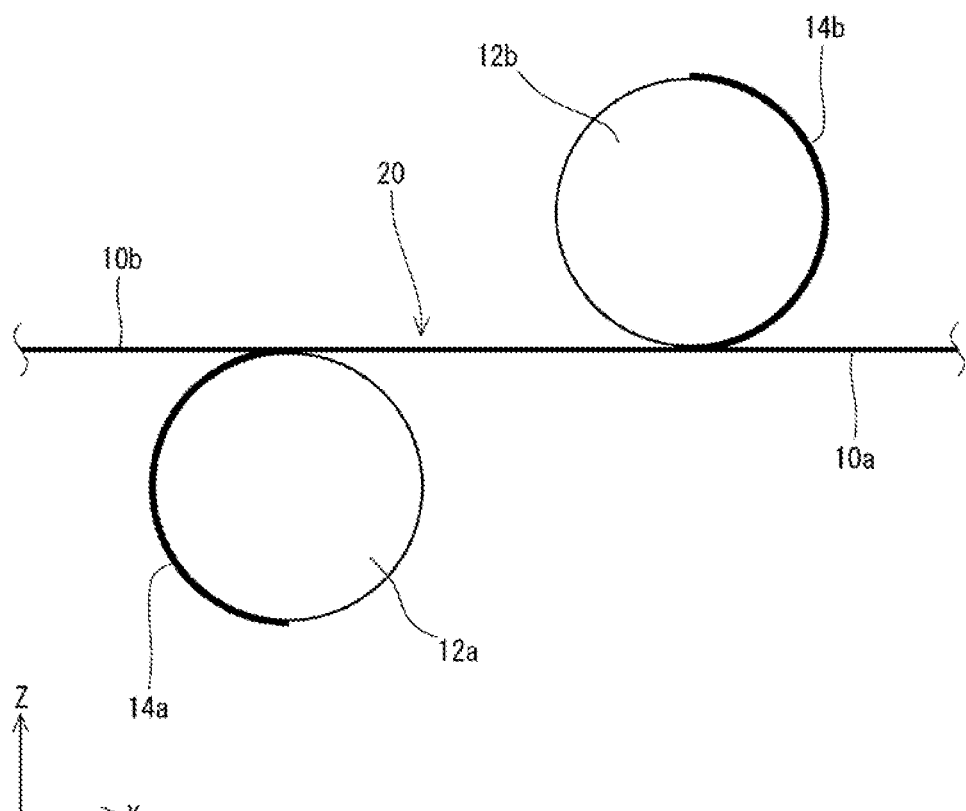
FIG. 11 is an enlarged front view showing yet another step of the production method of FIG. 2.
Figure 12:
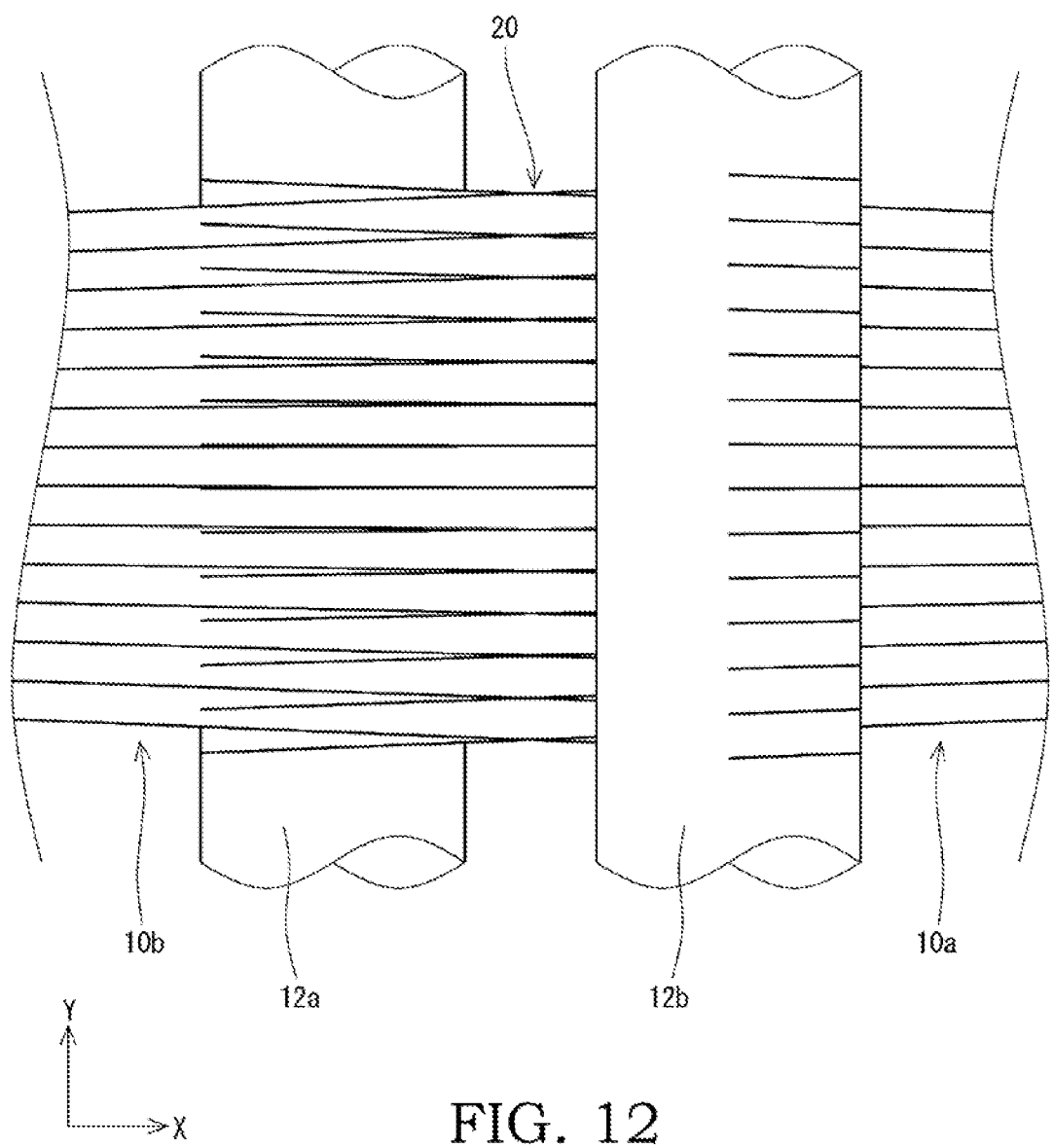
FIG. 12 is a plan view showing the step of FIG. 11.

Subsequently, the second roller 12b is moved relative to the first roller 12a in the Z direction and brought close to the first roller 12a (STEP 11). In the present embodiment, both the first and second rollers 12a and 12b are moved. Specifically, the first roller 12a is moved in the direction indicated by the arrow A1 of FIG. 10, and the second roller 12b is moved in the direction indicated by the arrow A2 of FIG. 10. FIGS. 11 and 12 show the first and second rollers 12a and 12b viewed after completion of the movements (STEP 11).

In FIG. 12, the width direction of the first web 10a is the Y direction, and the width direction of the second web 10b is also the Y direction. In other words, the width directions of the first and second webs 10a and 10b are the same. The width directions of the first and second webs 10a and 10b may be somewhat different.

In FIGS. 11 and 12, the portion of the first web 10a that extends between the top 16 of the first roller 12a and the bottom 18 of the second roller 12b and the portion of the second web 10b that extends between the top 16 of the first roller 12a and the bottom 18 of the second roller 12b are placed on each other. In other words, the portion of the first web 10a that is in the vicinity of the first roller 12a and the portion of the second web 10b that is in the vicinity of the second roller 12b are placed on each other. A joint 20 is formed by these portions placed on each other (STEP 12). At this joint 20, the carbon nanotubes 6 of the first web 10a and the carbon nanotubes 6 of the second web 10b are bound by van der Waals forces.

Subsequently, the holding margin 14a of the first web 10a is cut away from the rest of the first web 10a. Likewise, the holding margin 14b of the second web 10b is cut away from the rest of the second web 10b. In other words, the holding margins 14a and 14b are cut away from the joint 20 (STEP 13). The cutting away can be done using a needle or cutter blade. The cutting away may be skipped. The cutting away may be performed later. Only one of the holding margins 14a and 14b may be cut away.

Figure 13:
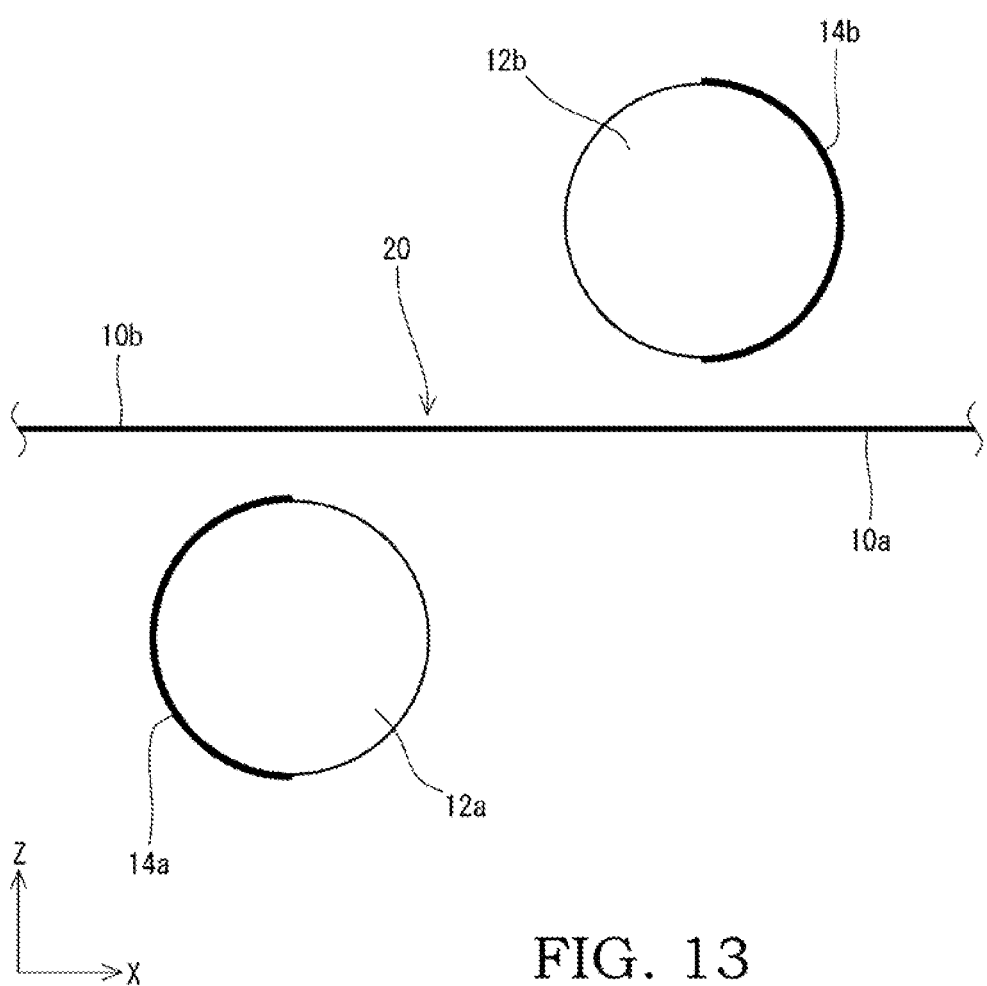
FIG. 13 is an enlarged front view showing yet another step of the production method of FIG. 2.

Subsequently, as shown in FIG. 13, the first roller 12a is moved in the Z direction and removed from the joint 20, and the second roller 12b is moved in the Z direction and removed from the joint 20 (STEP 14).

As previously stated, the holding margin 14a of the first web 10a has been cut away from the rest of the first web 10a. Thus, as shown in FIG. 13, the holding margin 14a of the first web 10a remains on the first roller 12a. In the case where the holding margin 14a is not cut away from the rest of the first web 10a, the first roller 12a is rotated clockwise before removal of the first roller 12a from the joint 20, and the holding margin 14a is placed on the second web 10b. In other words, the holding margin 14a constitutes a part of the joint 20.

As previously stated, the holding margin 14b of the second web 10b has been cut away from the rest of the second web 10b. Thus, as shown in FIG. 13, the holding margin 14b of the second web 10b remains on the second roller 12b. In the case where the holding margin 14b is not cut away from the rest of the second web 10b, the second roller 12b is rotated clockwise before removal of the second roller 12b from the joint 20, and the holding margin 14b is placed on the first web 10a. In other words, the holding margin 14b constitutes a part of the joint 20.

Figure 14:
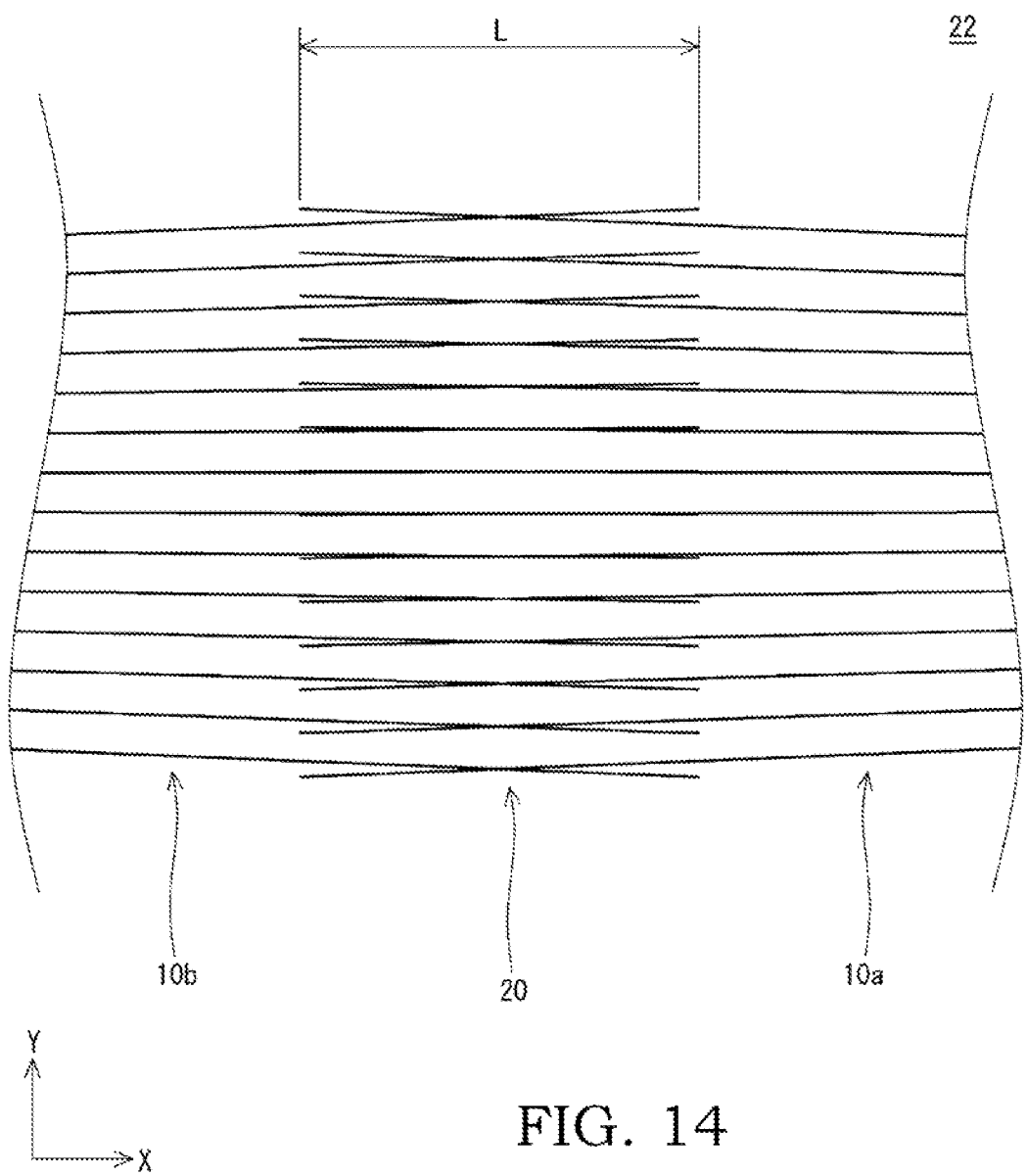
FIG. 14 is an enlarged plan view showing a part of a long web obtained by the production method of FIG. 2.

Through the above steps, the second web 10b is joined to the first web 10a, and thus a long web is obtained. FIG. 14 shows the long web 22 obtained. Another web may be additionally joined to the second web 10b. The joining may be performed a large number of times to obtain a long web composed of a large number of webs.

The long web 22 is wound on a reel. The long web 22 may be wound with a strip-shaped separator placed on the long web 22. The separator prevents contact between the upper and lower surfaces of the long web 22. Examples of the separator include a resin film and a sheet of paper. The long web 22 may be bundled to obtain a yarn. The long web 22 may be passed through a die to obtain a yarn. The long web 22 may be twisted to obtain a strand.

In FIG. 14, the arrow L represents the length of the joint 20. The length L is measured in the direction in which the long web 22 extends (X direction). The length L is preferably from 2 to 50 mm. The two webs can be securely joined at the joint 20 whose length L is 2 mm or more. From this viewpoint, the length L is more preferably 5 mm or more and particularly preferably 8 mm or more. The long web 22 whose length L is 50 mm or less is excellent in uniformity. From this viewpoint, the length L is more preferably 40 mm or less and particularly preferably 35 mm or less.

Preferred examples of the material forming the outer surface of the first roller 12a (i.e., the surface that contacts the first web 10a) include a rubber composition, a resin composition, a ceramic or metal material, and a carbon material. Preferred examples of the base component of the rubber composition include natural rubber, acrylonitrile-butadiene rubber, and urethane rubber. Preferred examples of the base component of the resin composition include urethane resin and fluororesin. Preferred examples of the metal material include stainless steel. Preferred examples of the carbon material include graphite. The outer surface of the first roller 12a may be coated with a carbon material such as diamond-like carbon. The first roller 12a whose outer surface is made of any of the above materials is resistant to adhesion of the carbon nanotubes 6. From this viewpoint, the rubber composition is particularly preferred.

Preferred examples of the material forming the outer surface of the second roller 12b (i.e., the surface that contacts the second web 10b) include a rubber composition, a resin composition, a ceramic or metal material, and a carbon material. Preferred examples of the base component of the rubber composition include natural rubber, acrylonitrile-butadiene rubber, and urethane rubber. Preferred examples of the base component of the resin composition include urethane resin and fluororesin. Preferred examples of the metal material include stainless steel. Preferred examples of the carbon material include graphite. The outer surface of the second roller 12b may be coated with a carbon material such as diamond-like carbon. The second roller 12b whose outer surface is made of any of the above materials is resistant to adhesion of the carbon nanotubes 6. From this viewpoint, the rubber composition is particularly preferred.

Figure 15:
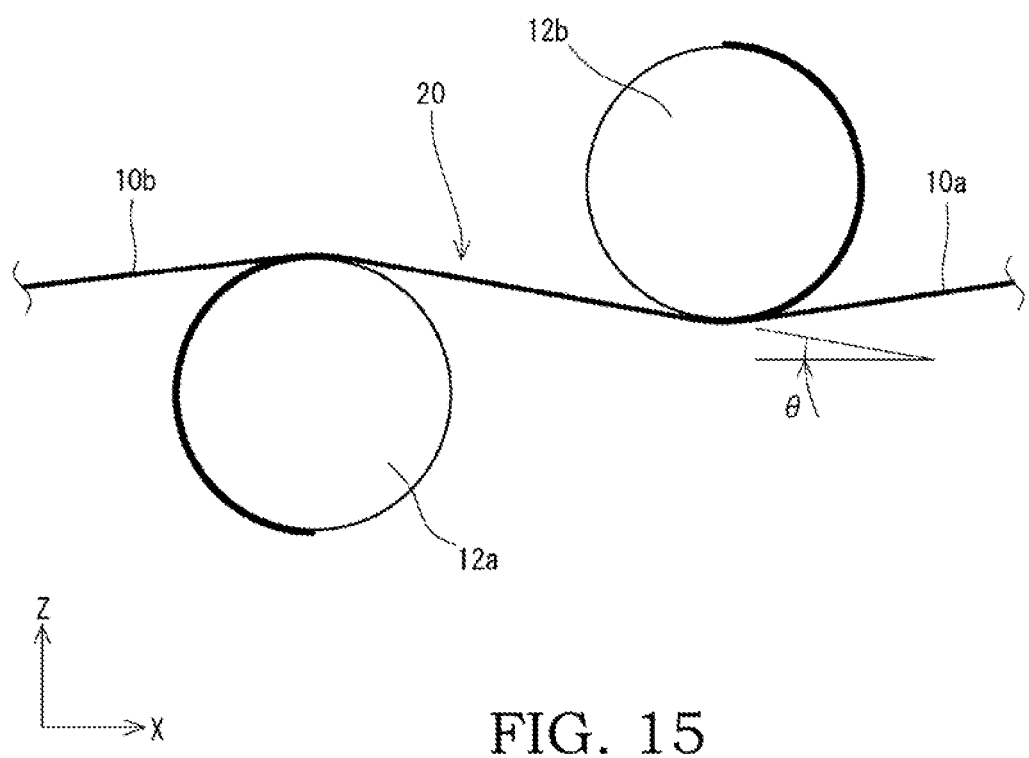
FIG. 15 is an enlarged front view showing yet another step of the production method of FIG. 2.

The production method may include the step of applying a tension to the joint 20. This step is performed after the formation of the joint 20 (STEP 12) and before the removal of the rollers 12a and 12b (STEP 14). FIG. 15 shows this step. In this step, the first roller 12a or second roller 12b is moved in the Z direction. In the embodiment of FIG. 15, the first roller 12a is moved upward from the position of FIG. 11, and the second roller 12b is moved downward from the position of FIG. 11. FIG. 15 shows the rollers 12a and 12b viewed after completion of the movements. The movements produce a tension applied to the joint 20. The second web 10b is securely jointed to the first web 10a by the tension.

The arrow $\theta$ in FIG. 15 represents the angle of the joint 20 with respect to the direction in which the long web 22 extends (X direction). To apply a sufficient tension to the joint 20, the angle $\theta$ is preferably 2° or more, more preferably 4° or more, and particularly preferably 5° or more. To prevent breakage of the long web 22, the angle $\theta$ is preferably 30° or less, more preferably 20° or less, and particularly preferably 15° or less.

Figure 16:
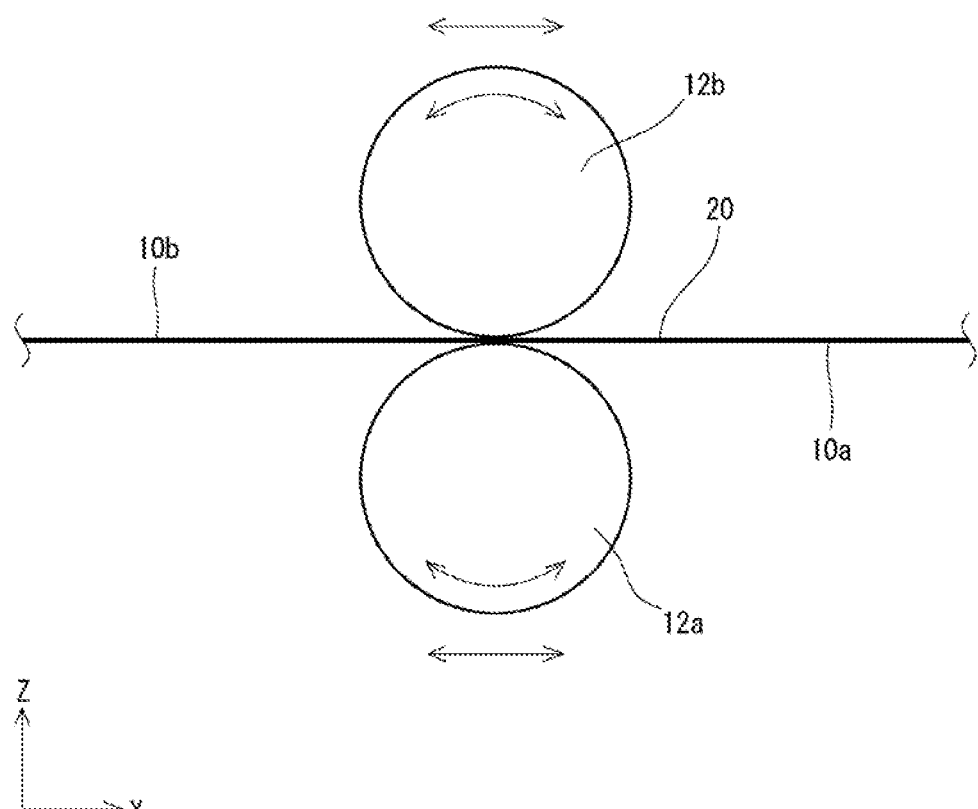
FIG. 16 is an enlarged front view showing yet another step of the production method of FIG. 2.

The production method may include the step of pressing the joint 20. This step is performed after the formation of the joint 20 (STEP 12) and before the removal of the rollers 12a and 12b (STEP 14). FIG. 16 shows this step. In this step, as indicated by arrows in FIG. 16, the first roller 12a or second roller 12b is moved in the X direction while being rotated. This movement leads to the joint 20 being sandwiched between the first and second rollers 12a and 12b. The joint 20 is pressed by the first and second rollers 12a and 12b. The second web 10b is securely jointed to the first web 10a by the pressing. The pressing may be accomplished by any means other than the first and second rollers 12a and 12b.

Figure 17:
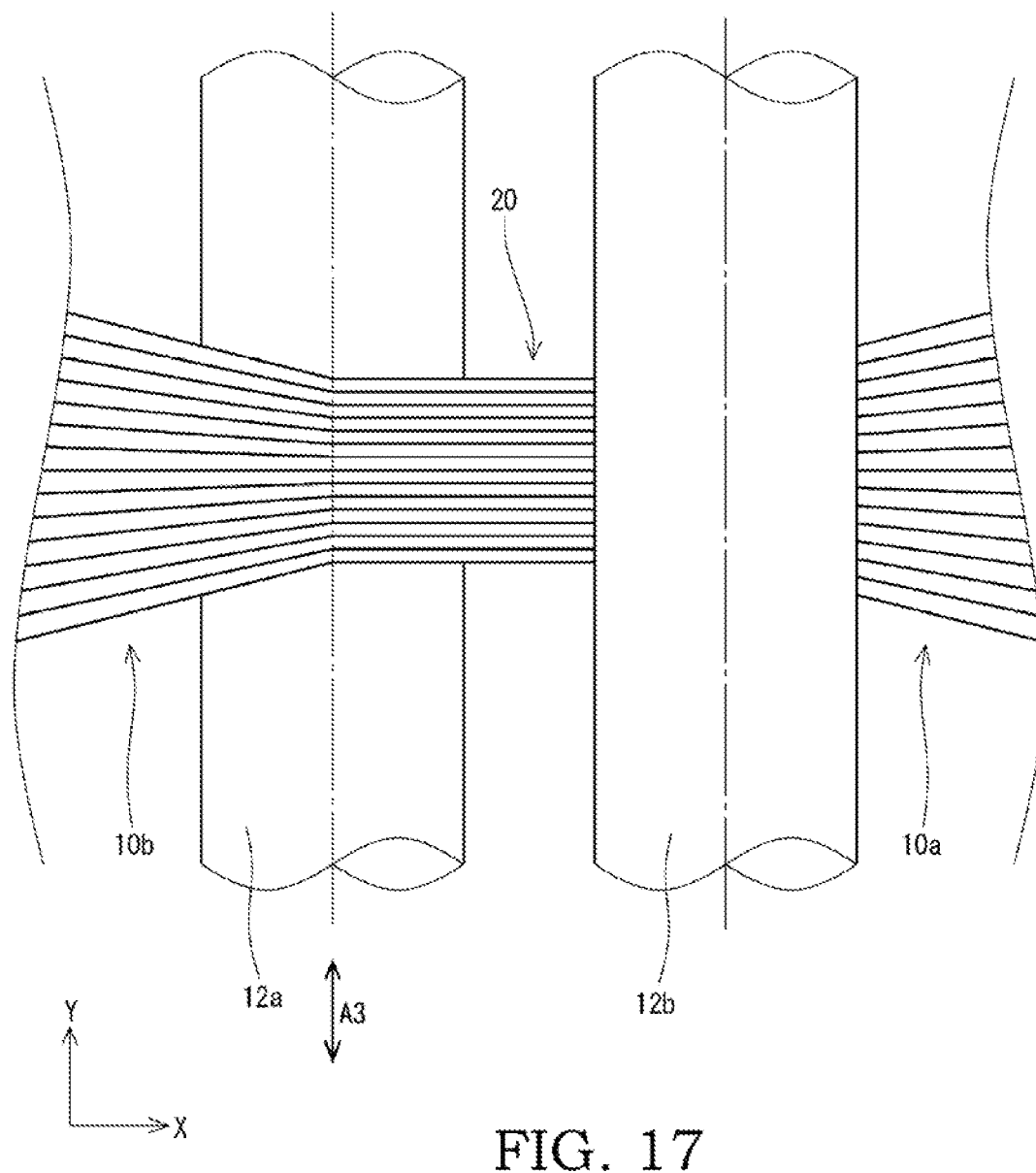
FIG. 17 is an enlarged front view showing yet another step of the production method of FIG. 2.

The production method may include the step of increasing the density of the carbon nanotubes 6 at the joint 20. This step is performed after the formation of the joint 20 (STEP 12) and before the removal of the rollers 12a and 12b (STEP 14). FIG. 17 shows this step. In this step, the first roller 12a is repeatedly moved relative to the second roller 12b. The arrow A3 in FIG. 17 represents the direction of the movement. The movement direction is a direction intersecting the longitudinal direction. In the present embodiment, the movement direction is the width direction (Y direction). Both the first and second rollers 12a and 12b may be moved. Only the second roller 12b may be moved. The movement leads to the carbon nanotubes 6 being bundled at the joint 20. The second web 10b is securely jointed to the first web 10a by the bundling. Three or more rollers (or other holders) may be used to bundle the carbon nanotubes 6.

The first roller 12a may be repeatedly moved relative to the second roller 12b at a site other than the joint 20. The repeated movement can yield a long member (e.g., a yarn) in which the density of the carbon nanotubes 6 is high at the site other than the joint 20.

The carbon nanotubes 6 of the long web 22 may be bundled into a yarn by wind pressure. An organic solvent (e.g., ethanol) may be sprayed onto the long web 22 to facilitate the bundling of the carbon nanotubes 6.

Figure 18A:
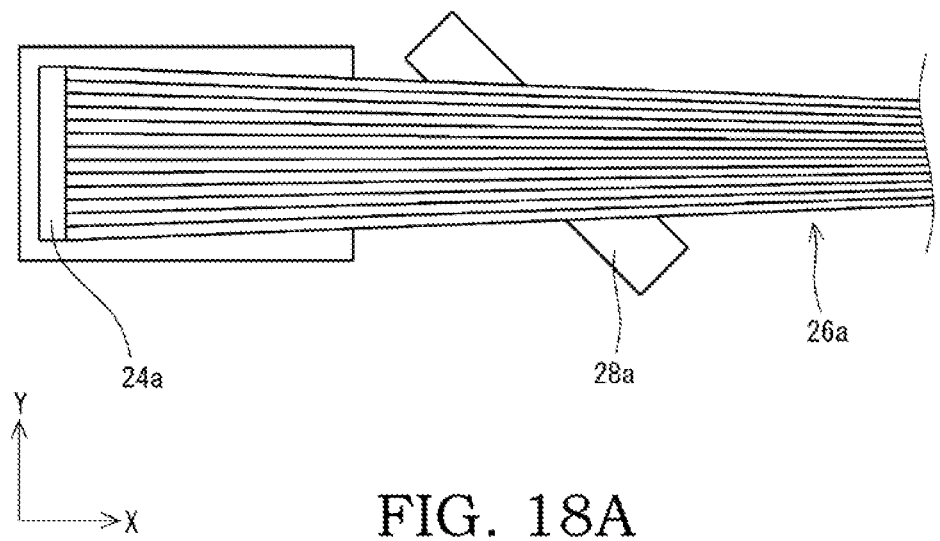
FIG. 18A is a plan view showing one step of a production method according to another embodiment of the present invention.
Figure 18B:
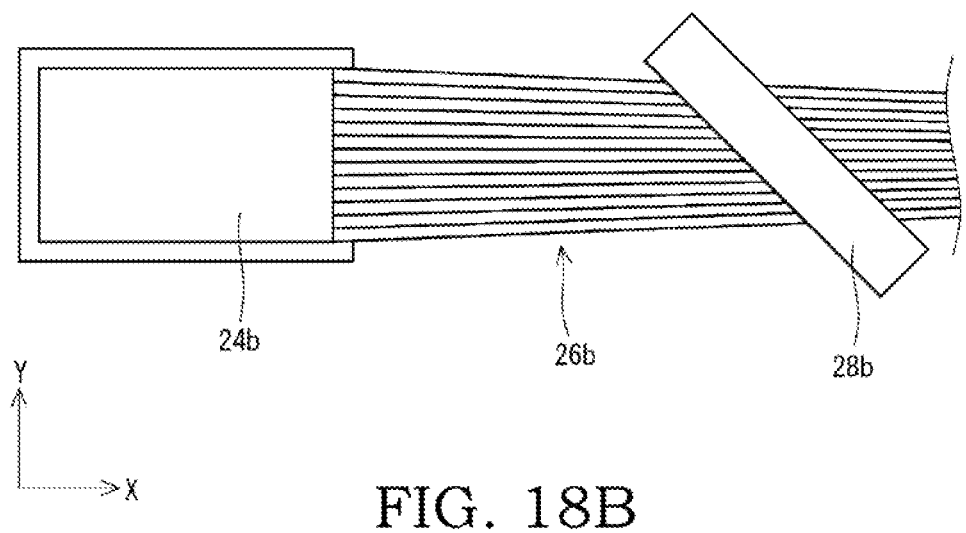
FIG. 18B is a plan view showing another step of the production method.

FIG. 18A is a plan view showing one step of a production method according to another embodiment of the present invention, and FIG. 18B is a plan view showing another step of the production method.

In FIG. 18A, a first web 26a is drawn from a first array 24a having a reduced size. FIG. 18A shows a first roller 28a serving as the first holder. The direction in which the first roller 28a extends is inclined with respect to the width direction of the first web 26a (Y direction). As in the embodiment illustrated in FIGS. 3 to 6, the first roller 28a is brought into contact with the first web 26a. Further, the first web 26a is cut at a point upstream of the first roller 28a. The cutting leads to the first web 26a being partially wound on the first roller 28a. The wound portion is a holding margin of the first web 26a. The first web 26a is held on the first roller 28a by the sticking force of the holding margin.

In FIG. 18B, a second web 26b is drawn from a second array 24b having a large size. FIG. 18B shows a second roller 28b serving as the second holder. The direction in which the second roller 28b extends is inclined with respect to the width direction of the second web 26b (Y direction). As in the embodiment illustrated in FIGS. 7 to 9, the second roller 28b is brought into contact with the second web 26b. Further, the second web 26b is cut at a point upstream of the second roller 28b. The cutting leads to the second web 26b being partially wound on the second roller 28b. The wound portion is a holding margin of the second web 26b. The second web 26b is held on the second roller 28b by the sticking force of the holding margin.

As in the embodiment illustrated in FIGS. 10 to 13, the second roller 28b is brought close to the first roller 28a, and thus a joint is formed. The second web 26b is joined to the first web 26a by the joint, and a long web is obtained.

Figure 19:
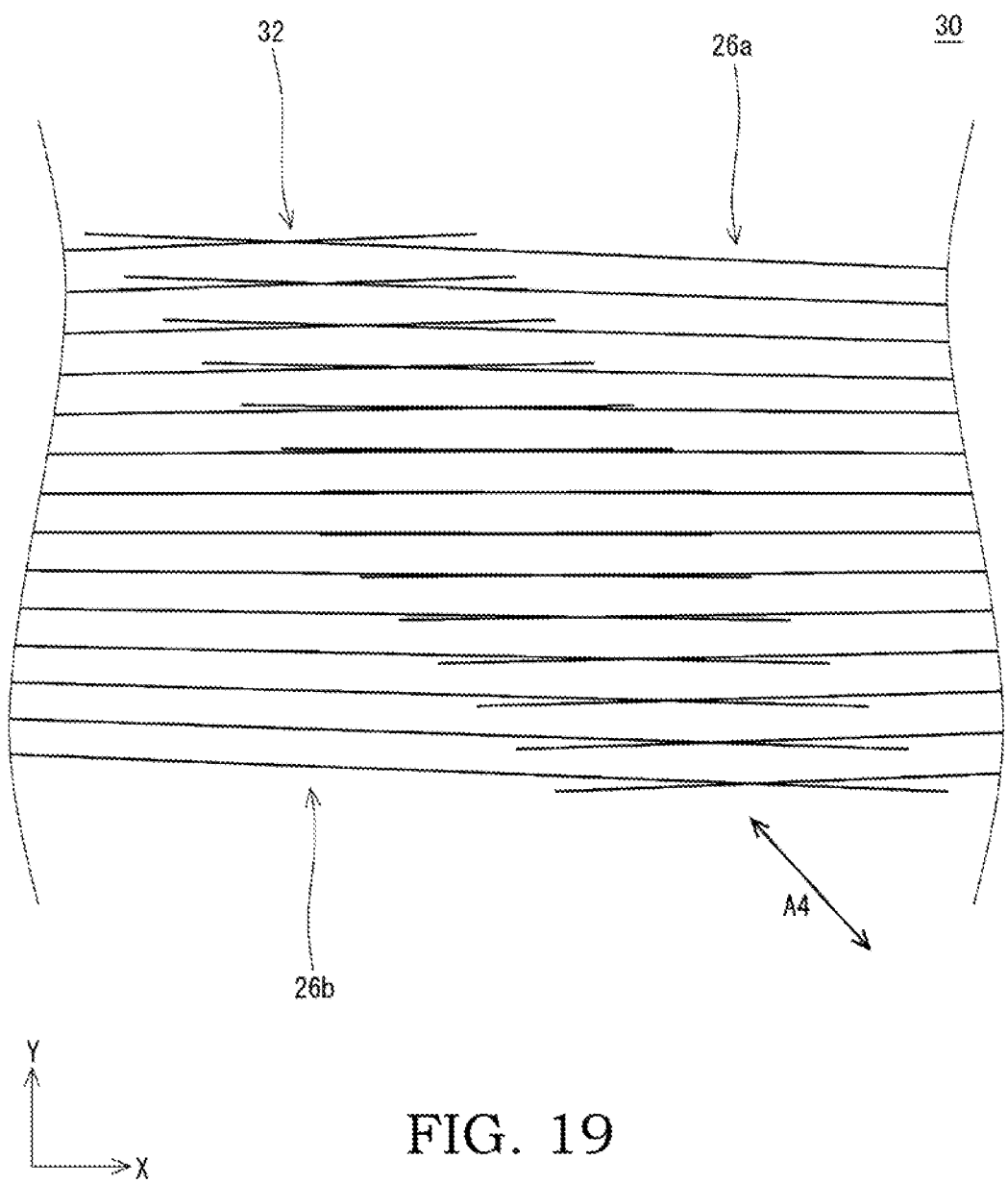
FIG. 19 is an enlarged plan view showing a part of a long web obtained by the production method of FIG. 18.

A part of the long web 30 is shown in FIG. 19. FIG. 19 shows a joint 32 and its vicinity. In FIG. 19, the arrow A4 represents the direction in which the joint 32 extends. Since the direction in which the first roller 28a extends is inclined with respect to the width direction of the first web 26a and the direction in which the second roller 28b extends is inclined with respect to the width direction of the second web 26b, the direction in which the joint 32 extends is inclined with respect to the width direction of the long web 30 (Y direction). In the long web 30, the density of the carbon nanotubes does not change abruptly in the longitudinal direction. The long web 30 has high quality. A yarn obtained from the long web 30 also has high quality.

The high-quality long web 30 can be obtained also by using an apparatus where the direction in which the first roller 28a extends is inclined with respect to the width direction of the first web 26a and the direction in which the second roller 28b extends is the same as the width direction of the second web 26b. The high-quality long web 30 can be obtained also by using an apparatus where the direction in which the first roller 28a extends is the same as the width direction of the first web 26a and the direction in which the second roller 28b extends is inclined with respect to the width direction of the second web 26b.

Figure 20:
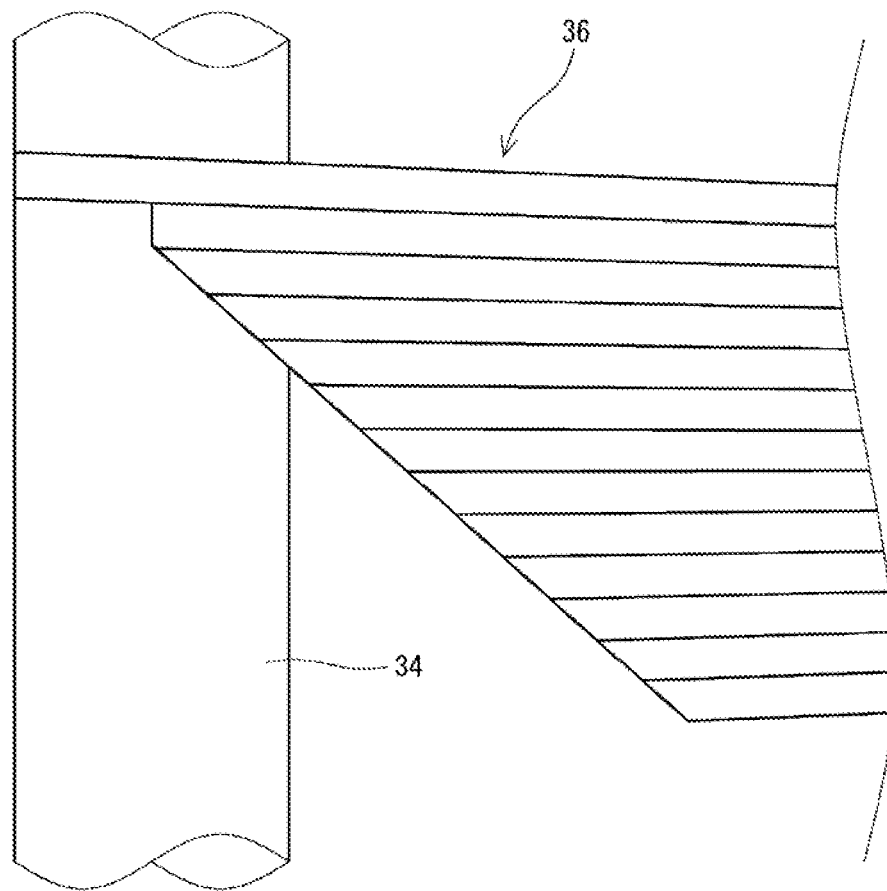
FIG. 20 is a plan view showing one step of a production method according to yet another embodiment of the present invention.

FIG. 20 is a plan view showing one step of a production method according to yet another embodiment of the present invention. FIG. 20 shows a first roller 34 serving as the first holder and a first web 36 held on the first roller 34. The first web 36 is shaped such that its width gradually increases downstream (rightward) in the vicinity of the first roller 34. This shape can be obtained by cutting a web. As in the embodiment illustrated in FIGS. 10 to 13, the second roller is brought close to the first roller 34, and thus a joint is formed. The second web is joined to the first web 36 by the joint, and a long web is obtained. Since the first web 36 is shaped as described above, the density of the carbon nanotubes at the joint does not change abruptly in the longitudinal direction. The long web has high quality. A yarn obtained from the long web also has high quality.

Figure 21:
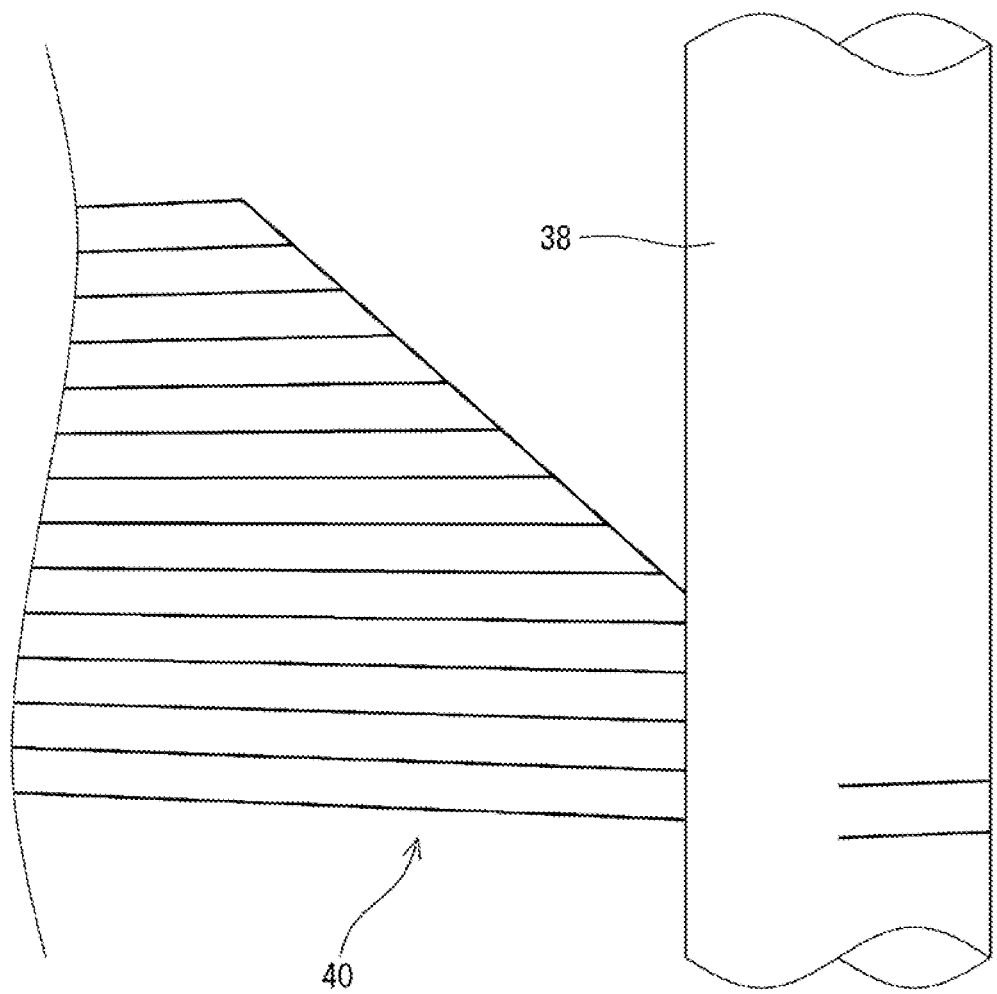
FIG. 21 is a plan view showing one step of a production method according to yet another embodiment of the present invention.

FIG. 21 is a plan view showing one step of a production method according to yet another embodiment of the present invention. FIG. 21 shows a second roller 38 serving as the second holder and a second web 40 held on the second roller 38. The second web 40 is shaped such that its width gradually increases upstream (leftward) in the vicinity of the second roller 38. This shape can be obtained by cutting a web. As in the embodiment illustrated in FIGS. 10 to 13, the second roller 38 is brought close to the first roller, and thus a joint is formed. The second web 40 is joined to the first web by the joint, and a long web is obtained. Since the second web 40 is shaped as described above, the density of the carbon nanotubes at the joint does not change abruptly in the longitudinal direction. The long web has high quality. A yarn obtained from the long web also has high quality.

Figure 22:
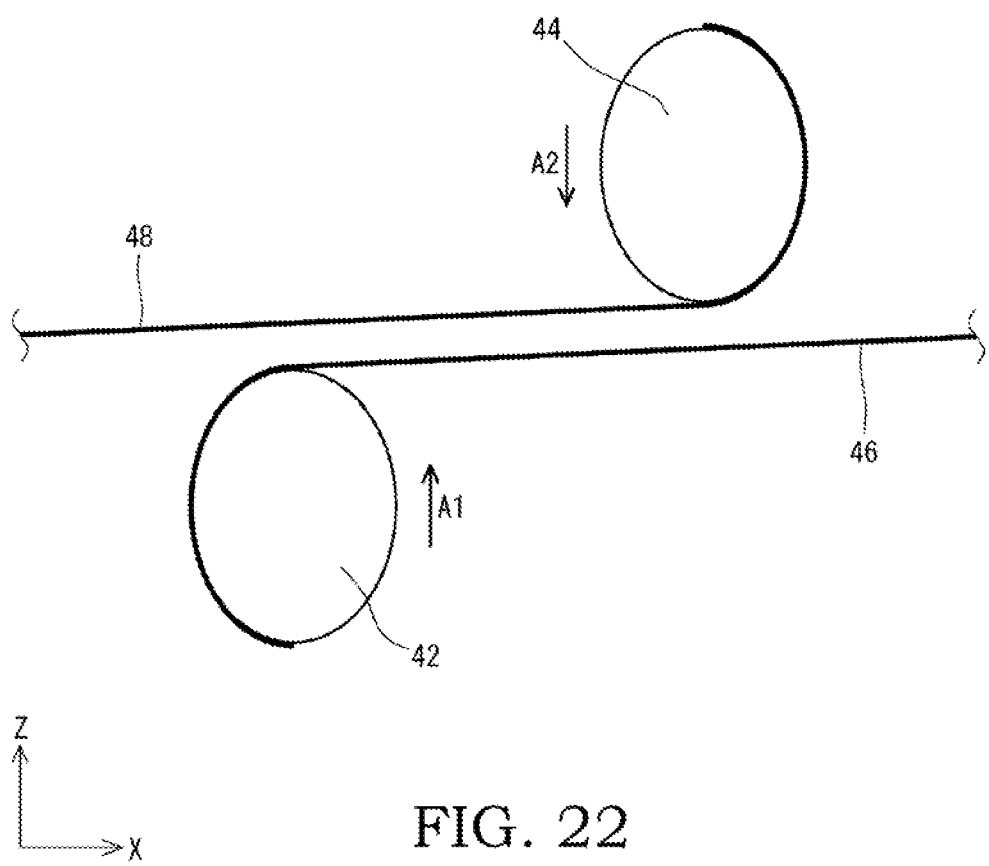
FIG. 22 is a front view showing one step of a production method according to yet another embodiment of the present invention.

FIG. 22 is a front view showing one step of a production method according to yet another embodiment of the present invention. FIG. 22 shows a first holder 42, a second holder 44, a first web 46, and a second web 48. The first holder 42 is elliptical in cross-section. The second holder 44 is elliptical in cross-section. The first web 46 is held on the first holder 42. The first holder 42, which is elliptical in cross-section, prevents detachment of the first web 46 from the first holder 42. The second web 48 is held on the second holder 44. The second holder 44, which is elliptical in cross-section, prevents detachment of the second web 48 from the second holder 44. As in the embodiment illustrated in FIGS. 10-13, the second holder 44 is brought close to the first holder 42, and thus a joint is formed. The second web 48 is joined to the first web 46 by the joint, and a long web is obtained.

Figure 23:
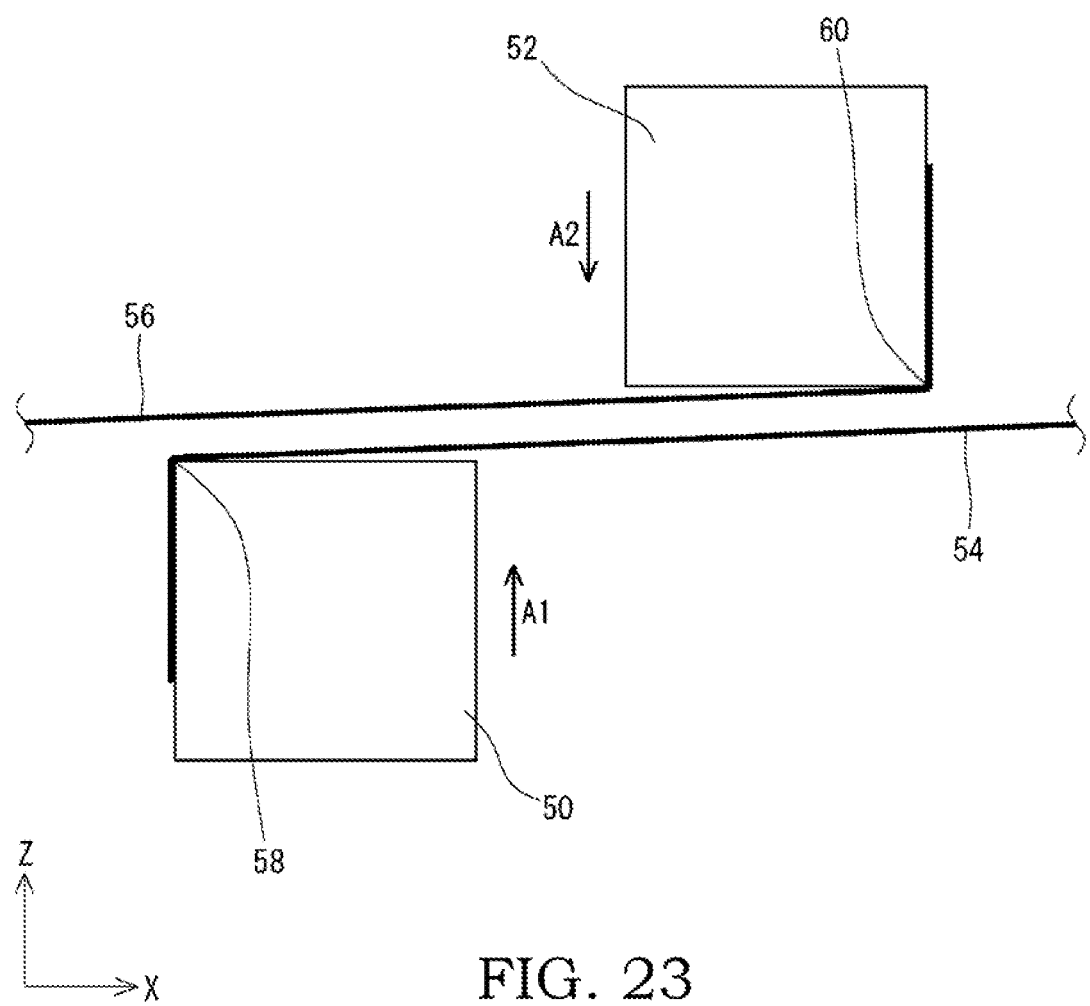
FIG. 23 is a front view showing one step of a production method according to yet another embodiment of the present invention.

FIG. 23 is a front view showing one step of a production method according to yet another embodiment of the present invention. FIG. 23 shows a first holder 50, a second holder 52, a first web 54, and a second web 56. The first holder 50 is rectangular in cross-section. The second holder 52 is rectangular in cross-section. The first web 54 is held on the first holder 50. A corner 58 of the first holder 50 prevents detachment of the first web 54 from the first holder 50. The second web 56 is held on the second holder 52. A corner 60 of the second holder 52 prevents detachment of the second web 56 from the second holder 52. As in the embodiment illustrated in FIGS. 10-13, the second holder 52 is brought close to the first holder 50, and thus a joint is formed. The second web 56 is joined to the first web 54 by the joint, and a long web is obtained.

Figure 24:
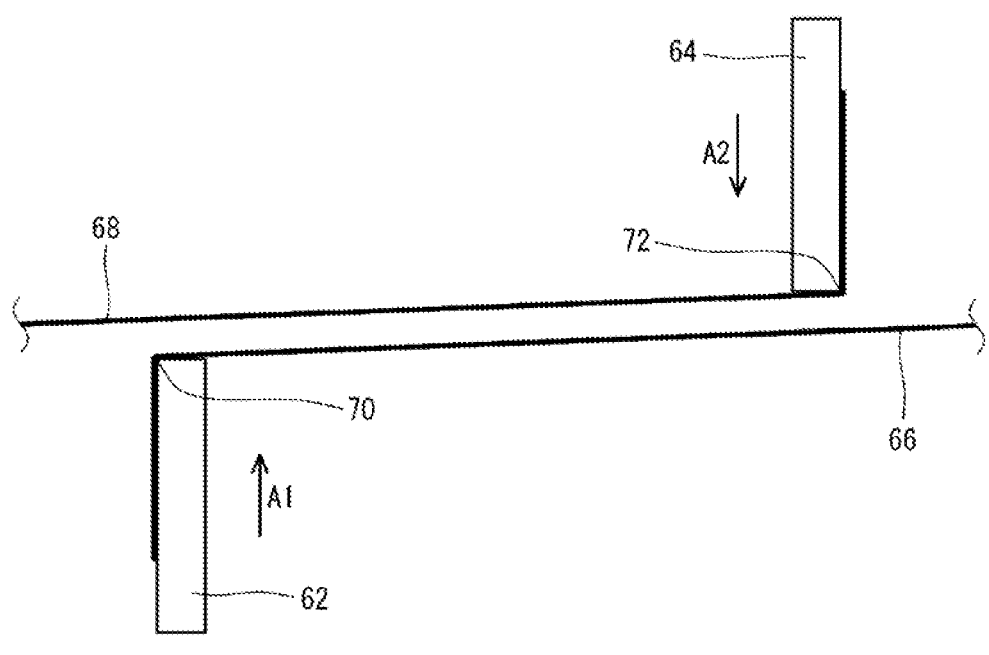
FIG. 24 is a front view showing one step of a production method according to yet another embodiment of the present invention.

FIG. 24 is a front view showing one step of a production method according to yet another embodiment of the present invention. FIG. 24 shows a first holder 62, a second holder 64, a first web 66, and a second web 68. The first holder 62 is in the form of a plate. The second holder 64 is in the form of a plate. The first web 66 is held on the first holder 62. A corner 70 of the first holder 62 prevents detachment of the first web 66 from the first holder 62. The second web 68 is held on the second holder 64. A corner 72 of the second holder 64 prevents detachment of the second web 68 from the second holder 64. As in the embodiment illustrated in FIGS. 10-13, the second holder 64 is brought close to the first holder 62, and thus a joint is formed. The second web 68 is joined to the first web 66 by the joint, and a long web is obtained.

In the production method according to the present invention, holders of various shapes can be used. Holders that are polygonal (triangular, pentagonal, hexagonal, or octagonal) in cross-section can be used. Holders that are elongated and rounded in cross-section can also be used. The elongated, rounded shape includes a shape resembling a racetrack of an athletics field. This shape is composed of two opposing semicircles spaced by a given distance and two straight lines drawn between the semicircles.

Figure 25:
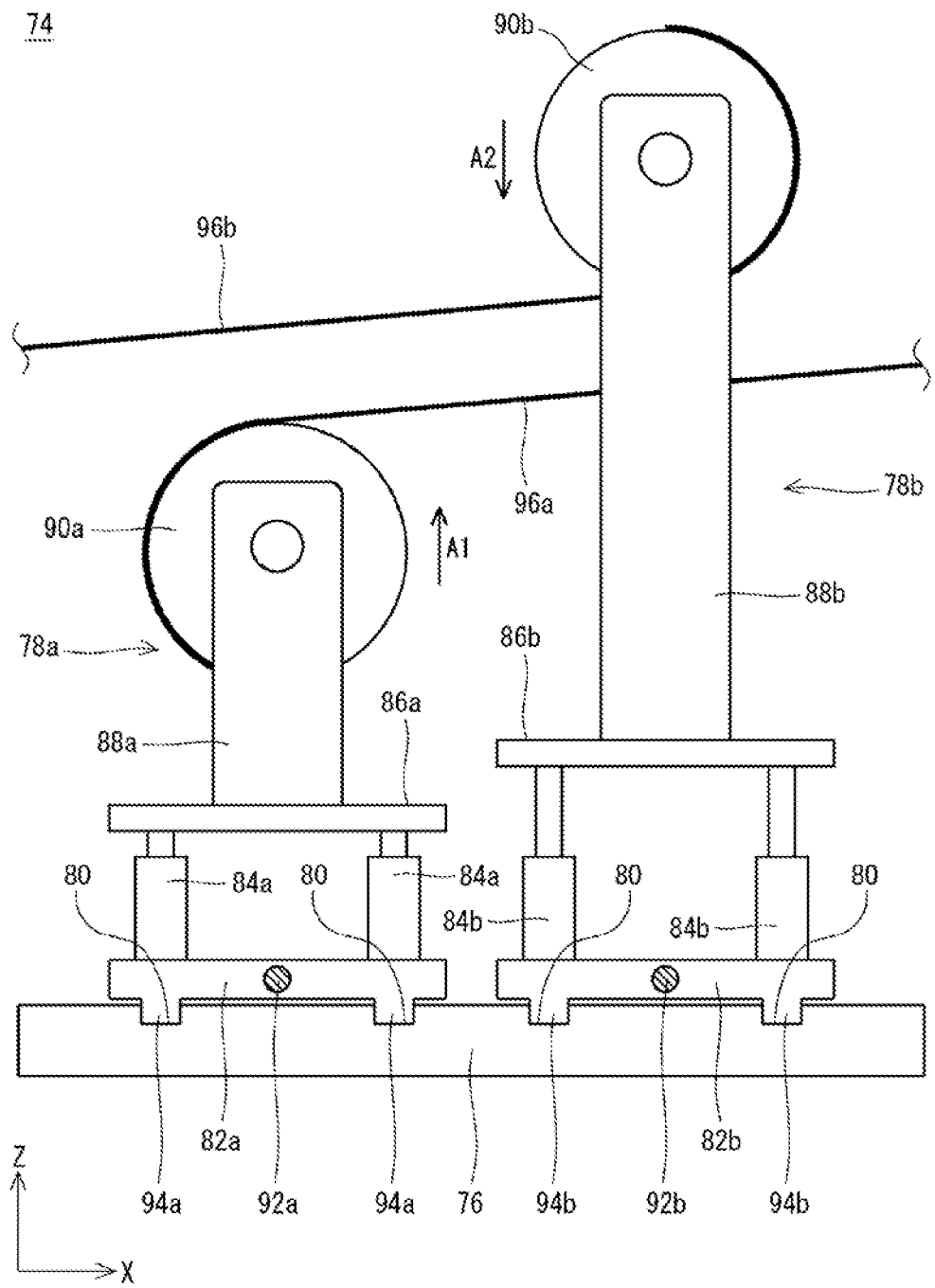
FIG. 25 is a front view showing a production apparatus used for the method of FIG. 2.
Figure 26:
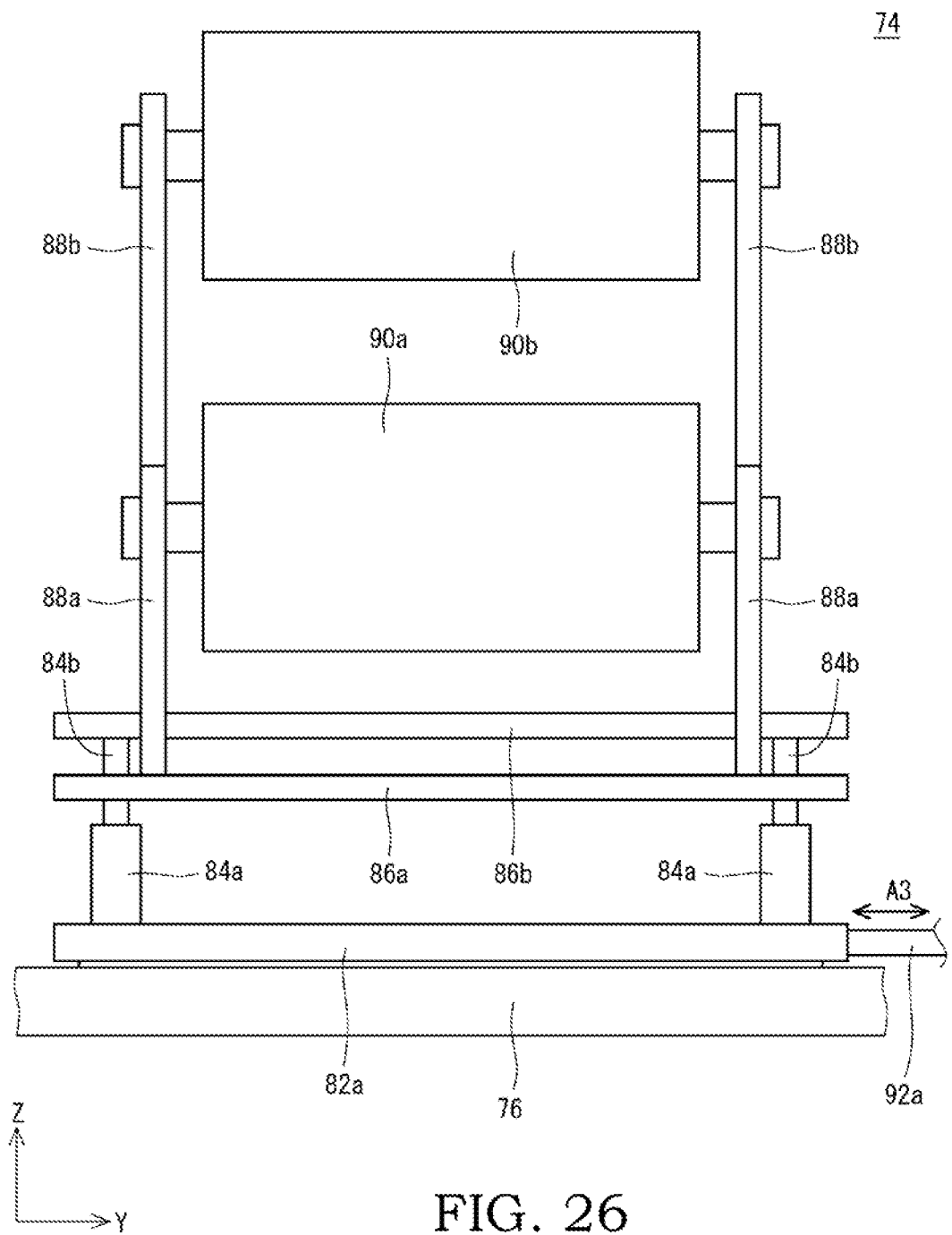
FIG. 26 is a left side view showing the apparatus of FIG. 25.

FIGS. 25 and 26 show an example of an apparatus 74 suitable for use in the production method according to the present invention. The apparatus 74 includes a base 76, a first part 78a, and a second part 78b. The base 76 has four grooves 80 in its upper surface. The first part 78a is located upstream (to the left in FIG. 25) of the second part 78b.

The first part 78a includes a first under mount 82a, four first pistons 84a, a first upper mount 86a, a pair of first supports 88a, a first roller 90a (first holder), and a first arm 92a.

The first under mount 82a includes two first rails 94a. Each first rail 94a is fitted in a corresponding one of the grooves 80 of the base 76. The first rails 94a are slidable along the grooves 80. The first under mount 82a may include rollers or wheels instead of or in addition to the rails 94a.

Each first piston 84a rises from the first under mount 82a. The lower ends of the first pistons 84a are secured to the first under mount 82a. The first pistons 84a are extendable and retractable. The direction of extension/retraction is the up-down direction (Z direction).

The first upper mount 86a is located above the four first pistons 84a. The upper ends of the first pistons 84a are secured to the first upper mount 86a. The first upper mount 86a is movable in the up-down direction by extension and retraction of the first pistons 84a.

Each first support 88a rises from the first upper mount 86a. The first supports 88a are secured to the first upper mount 86a. The first roller 90a is mounted to extend between one of the first supports 88a and the other of the first supports 88a. The first roller 90a has the same structure as the roller 12a shown in FIGS. 3 to 6. As described above, the first upper mount 86a is movable in the up-down direction. Along with this movement, the first supports 88a and first roller 90a are also moved in the up-down direction.

One end of the first arm 92a is coupled to the first under mount 82a. As shown in FIG. 26, the first arm 92a extends in the Y direction. The other end of the first arm 92a is coupled to an actuator which is not shown. A typical example of the actuator is a motor. The first arm 92a is driven by the actuator to reciprocate as indicated by the arrow A3 in FIG. 26. The reciprocation is a motion in the Y direction. Along with this reciprocation, the first part 78a is reciprocated in its entirety. The reciprocation of the first part 78a is effected by the first rails 94a being guided by the grooves 80.

The second part 78b includes a second under mount 82b, four second pistons 84b, a second upper mount 86b, a pair of second supports 88b, a second roller 90b (second holder), and a second arm 92b.

The second under mount 82b includes two second rails 94b. Each second rail 94b is fitted in a corresponding one of the grooves 80 of the base 76. The second rails 94b are slidable along the grooves 80. The second under mount 82b may include rollers or wheels instead of or in addition to the rails 94b.

Each second piston 84b rises from the second under mount 82b. The lower ends of the second pistons 84b are secured to the second under mount 82b. The second pistons 84b are extendable and retractable. The direction of extension/retraction is the up-down direction (Z direction).

The second upper mount 86b is located above the four second pistons 84b. The upper ends of the second pistons 84b are secured to the second upper mount 86b. The second upper mount 86b is movable in the up-down direction by extension and retraction of the second pistons 84b.

Each second support 88b rises from the second upper mount 86b. The second supports 88b are secured to the second upper mount 86b. The second roller 90b is mounted to extend between one of the second supports 88b and the other of the second supports 88b. The second roller 90b has the same structure as the roller 12b shown in FIGS. 7 to 9. As described above, the second upper mount 86b is movable in the up-down direction. Along with this movement, the second supports 88b and second roller 90b are also moved in the up-down direction.

One end of the second arm 92b is coupled to the second under mount 82b.

Although not shown, the second arm 92b extends in the Y direction. The other end of the second arm 92b is coupled to an actuator which is not shown. A typical example of the actuator is a motor. The second arm 92b is driven by the actuator to reciprocate in the Y direction. Along with this reciprocation, the second part 78b is reciprocated in its entirety. The reciprocation of the second part 78b is effected by the second rails 94b being guided by the grooves 80.

The following describes an example of how to use the apparatus 74. To obtain a long web by the apparatus 74, the upstream edge of a first web 96a is held on the first roller 90a. Further, the downstream edge of a second web 96b is held on the second roller 90b. Subsequently, the first pistons 84a are extended to raise the first roller 90a as indicated by the arrow A1 in FIG. 25. Further, the second pistons 84b are extended to lower the second roller 90b as indicated by the arrow A2 in FIG. 25. The raising and lowering lead to the second web 96b being placed on the first web 96a. A joint 20 (see FIG. 14) is formed as a result of the placement of the second web 96b on the first web 96a, and a long web is obtained. The first roller 90a need not be moved, and only the second roller 90b may be moved. The second roller 90b need not be moved, and only the first roller 90a may be moved.

Next, the first part 78a is reciprocated in the Y direction, and the second part 78b is reciprocated in the Y direction. The period of the reciprocation of the first part 78a is the same as that of the second part 78b. The movement direction of the first part 78a is opposite to that of the second part 78b. The reciprocating motions lead to the carbon nanotubes being bundled at the joint 20, thus resulting in an increased density of the carbon nanotubes at the joint 20. The first part 78a need not be reciprocated, and only the second part 78b may be reciprocated. The second part 78b need not be reciprocated, and only the first part 78a may be reciprocated. A long web may be obtained by the apparatus 74 devoid of any mechanism for reciprocation.

The first part 78a may include another first holder instead of the first roller 90a. The first part 78a can include any of the first holders shown in FIGS. 22 to 24. The second part 78b may include another second holder instead of the second roller 90b. The second part 78b can include any of the second holders shown in FIGS. 22 to 24.

The first and second pistons 84a and 84b are moving mechanisms for the rollers. The apparatus 74 may include moving mechanisms other than pistons.

INDUSTRIAL APPLICABILITY

The production method according to the present invention can yield a long member suitable for various applications utilizing the characteristics of carbon nanotubes.

REFERENCE SIGNS LIST 2a first array
2b second array
4 substrate
6 carbon nanotube
10a first web
10b second web
12a first roller
12b second roller
14a holding margin of first web
14b holding margin of second web
20 joint
22 long web
24a first array
24b second array
26a first web
26b second web
28a first roller
28b second roller
30 long web
32 joint
34 first roller
36 first web
38 second roller
40 second web
42 first holder
44 second holder
46 first web
48 second web
50 first holder
52 second holder
54 first web
56 second web
62 first holder
64 second holder
66 first web
68 second web
74 apparatus
76 base
78a first part
78b second part
80 groove
82a first under mount
82b second under mount
84a first piston
84b second piston
86a first upper mount
86b second upper mount
88a first support
88b second support
90a first roller
90b second roller
92a first arm
92b second arm
94a first rail
94b second rail
96a first web
96b second web

The invention claimed is:

1. A production method of a long member including a large number of carbon nanotubes, the production method comprising the steps of:
    (1) drawing carbon nanotubes gradually from a first array to obtain a first web;
    (2) bringing the first web partially into contact with a first holder to hold the first web on the first holder;
    (3) drawing carbon nanotubes gradually from a second array to obtain a second web;
    (4) bringing the second web partially into contact with a second holder to hold the second web on the second holder; and
    (5) placing a portion of the first web and a portion of the second web on each other to form a joint, the portions of the first and second webs being in the vicinity of the first and second holders, respectively, and being placed on each other such that width directions of the first and second webs are substantially the same.

2. The production method according to claim 1, further comprising the step of applying a tension to the joint after the step (5).

3. The production method according to claim 1, further comprising the step of pressing the joint after the step (5).

4. The production method according to claim 1, further comprising the step of cutting a portion of the first web away from the joint after the step (5), the portion of the first web remaining on the first holder.

5. The production method according to claim 1, further comprising the step of cutting a portion of the second web away from the joint after the step (5), the portion of the second web remaining on the second holder.

6. The production method according to claim 1, further comprising the step of moving the first or second holder in a direction intersecting a longitudinal direction of the long member to increase a density of the carbon nanotubes at the joint after the step (5).

7. The production method according to claim 1, further comprising the step of bundling the carbon nanotubes of the first and second webs into a yarn after the step (5).

8. The production method according to claim 1, wherein the first holder used in the step (2) has a width equal to or greater than a width of the first web.

9. The production method according to claim 1, wherein the second holder used in the step (4) has a width equal to or greater than a width of the second web.

10. The production method according to claim 1, wherein the first holder used in the step (2) is made of a material selected from: a rubber composition containing natural rubber, acrylonitrile-butadiene rubber, or urethane rubber as a base component; a resin composition containing urethane resin or fluororesin as a base component; and a ceramic or metal material.

11. The production method according to claim 1, wherein the second holder used in the step (4) is made of a material selected from: a rubber composition containing natural rubber, acrylonitrile-butadiene rubber, or urethane rubber as a base component; a resin composition containing urethane resin or fluororesin as a base component; and a ceramic or metal material.

12. The production method according to claim 1, wherein the first web used in the step (2) is shaped such that a width of the first web gradually increases downstream in the vicinity of the first holder.

13. The production method according to claim 1, wherein the second web used in the step (4) is shaped such that a width of the second web gradually increases upstream in the vicinity of the second holder.

14. The production method according to claim 1, wherein the joint formed in the step (5) has a length of 2 to 50 mm.

\* \* \* \* \*